United States Patent
Holaway et al.

(10) Patent No.: US 6,367,144 B1
(45) Date of Patent: Apr. 9, 2002

(54) METHOD OF MAKING A HEAD SUSPENSION WITH COMPLIANT FEATURE FOR COMPONENT LOCATION

(75) Inventors: Brett T. Holaway, Cosmos; Mark A. Miller, Hutchinson; Eric O. Naatz, Hutchinson; John A. Rickeman, Hutchinson; Richard A. Schnitzler, Dassel; Raymond R. Wolter; David J. Zachmeyer, both of Hutchinson, all of MN (US)

(73) Assignee: Hutchinson Technology, Inc., Hutchinson, MN (US)

( * ) Notice: Subject to any disclaimer, the term of this patent is extended or adjusted under 35 U.S.C. 154(b) by 0 days.

(21) Appl. No.: 09/397,940

(22) Filed: Sep. 17, 1999

(51) Int. Cl.⁷ .................................................. G11B 5/42
(52) U.S. Cl. ....................................... 29/603.03; 269/48
(58) Field of Search ........................ 29/603.03, 603.04, 29/603.05, 603.06; 269/47, 48; 360/245.3

(56) References Cited

U.S. PATENT DOCUMENTS

| | | |
|---|---|---|
| 5,491,597 A | 2/1996 | Bennin et al. |
| 5,570,249 A | 10/1996 | Aoyagi et al. |
| 5,920,444 A | 7/1999 | Heeren et al. |
| 6,055,133 A | 4/2000 | Albrecht et al. |

FOREIGN PATENT DOCUMENTS

JP   11-110924   4/1999

*Primary Examiner*—Carl E. Hall
(74) *Attorney, Agent, or Firm*—Faegre & Benson, LLP

(57) ABSTRACT

A head suspension for supporting a head slider over a rigid disk in a dynamic storage device having a component that includes a compliant feature adapted to engage a first pin and a datum engaging surface spaced from the compliant feature. The component being locatable relative to a datum by manipulation of the component with respect to the datum and a first pin to cause the first pin to engage and deflect the compliant feature when the datum engaging surface of the component is engaged and positioned with respect to the datum. The head suspension also including a second component having a pin engaging feature and possibly a datum engaging surface alignable with the compliant feature and datum engaging surface of the first component, respectively. The pin engaging feature of the second component being compliant or non-compliant. The compliant and non-compliant features being usable for locating head suspension components, such as load beams, flexures, and base plates, relative to each other or to tooling for head suspension fabrication purposes. The compliant and non-compliant features also being usable for locating other types of small precision components relative to a datum or to each other. A method for locating a component relative to a datum using a compliant feature formed within the component is also provided

27 Claims, 17 Drawing Sheets

METHOD OF MAKING A HEAD SUSPENSION WITH COMPLIANT FEATURE FOR COMPONENT LOCATION

FIELD OF THE INVENTION

The present invention relates to an improved head suspension having a compliant feature and associated tooling, for efficiently and accurately locating components during assembly of the head suspension.

BACKGROUND OF THE INVENTION

In a dynamic storage device, a rotating disk is employed to store information in small magnetized domains strategically located on the disk surface. The disk is attached to and rotated by a spindle motor mounted to a frame of the disk storage device. A "head slider" (also commonly referred to simply as a "slider") having a magnetic read/write head is positioned in close proximity to the rotating disk to enable the writing and reading of data to and from the magnetic domains on the disk. The head slider is supported and properly oriented in relationship to the disk by a head suspension that provides forces and compliances necessary for proper slider operation. As the disk in the storage device rotates beneath the slider and head suspension, the air above the disk similarly rotates, thus creating an air bearing which acts with an aerodynamic design of the head slider to create a lift force on the head slider. The lift force is counteracted by the head suspension, thus positioning the slider at a height and alignment above the disk which is referred to as the "fly height."

Typical head suspensions include a load beam, a flexure, and a base plate. The load beam normally includes a mounting region at a proximal end of the load beam for mounting the head suspension to an actuator of the disk drive, a rigid region, and a spring region between the mounting region and the rigid region for providing a spring force to counteract the aerodynamic lift force acting on the slider described above. The base plate is mounted to the mounting region of the load beam to facilitate the attachment of the head suspension to the actuator. The flexure is positioned at the distal end of the load beam, and typically includes a gimbal region having a slider mounting surface to which the slider is mounted and thereby supported in read/write orientation with respect to the rotating disk. The gimbal region is resiliently moveable with respect to the remainder of the flexure in response to the aerodynamic forces generated by the air bearing.

In one type of three-piece head suspension, the flexure is formed as a separate component and further includes a load beam mounting region that is rigidly mounted at the distal end of the load beam using conventional means, such as spot welds. In such a flexure, the gimbal region extends distally from the load beam mounting region of the flexure and includes a cantilever beam to which the slider is mounted. An often spherical dimple that extends between the load beam and the slider mounting surface of the flexure is formed in either the load beam or the slider mounting surface of the flexure. The dimple transfers the spring force generated by the spring region of the load beam to the flexure and the slider to counteract the aerodynamic force generated by the air bearing between the slider and the rotating disk. In this manner, the dimple acts as a "load point" between the flexure/slider and the load beam. The load point dimple also provides clearance between the cantilever beam of the flexure and the load beam, and serves as a point about which the slider can gimbal in pitch and roll directions in response to fluctuations in the aerodynamic forces generated by the air bearing.

Electrical interconnection between the head slider and circuitry in the disk storage device is provided along the length of the head suspension. Conventionally, conductive wires encapsulated in insulating tubes are strung along the length of the head suspension between the head slider and the storage device circuitry. Alternatively, an integrated lead head suspension, such as that described in commonly assigned U.S. Pat. No. 5,491,597 to Bennin et al., that includes one or more conductive traces bonded to the load beam with a dielectric adhesive can be used to provide electrical interconnection. Such an integrated lead head suspension may include one or more bonding pads at the distal end of the traces to which the head slider is attached and that provide electrical interconnection to termiinals on the head slider. The conductive trace can also be configured to provide sufficient resiliency to allow the head slider to gimbal in response to the variations in the aerodynamic forces.

As the number and density of magnetic domains on the rotating disk increase, it becomes increasingly important that the head slider be precisely aligned over the disk to ensure the proper writing and reading of data to and from the magnetic domains. Moreover, misalignments between the head slider and the disk could result in the head slider "crashing" into the disk surface as the slider gimbals due to the close proximity of the head slider to the rotating disk at the slider fly height.

The angular position of the head suspension and the head slider, also known as the static attitude, is calibrated so that when the disk drive is in operation the head slider assumes an optimal orientation at the fly height. It is therefore important that the static attitude of the head suspension be properly established. Toward this end, the flexure must be mounted to the load beam so that misalignments between the flexure and the load beam are minimized since misalignments between the load beam and flexure may introduce a bias in the static attitude of the head suspension and the head slider. It is also important that the load point dimple be properly formed on the head suspension so that it is properly positioned in relation to the head slider when the head slider is mounted to the head suspension. Misalignments between the load point dimple and the head slider may cause a torque to be exerted on the head slider, and thus affect the fly height of the head slider and the orientation of the head slider at the fly height. These concerns are emphasized when integrated leads are used to provide electrical interconnection since the bond pads of the integrated leads (to which the head slider is bonded) are directly affected by the positioning of the flexure.

To assist in the alignment of the head suspension components and in the formation of head suspension features, the head suspension typically includes reference apertures that are engaged by an alignment tool. The apertures are longitudinally spaced apart and are formed in the rigid region of the load beam. In head suspensions that include a separate flexure mounted to the load beam, the flexure includes corresponding apertures formed in the load beam mounting region of the flexure. The reference apertures in the load beam and the flexure are typically circular, and are sized and positioned so as to be substantially concentric when the flexure is mounted to the load beam. In an approach illustrated in U.S. Pat. No. 5,570,249 to Aoyagi et al., rather than being circular, a distal aperture in the load beam is elongated and generally elliptical. The aperture includes a "v" shaped portion at one end.

Rigid cylindrical pins on an alignment tool are used to align the individual head suspension components. The rigid pins are spaced apart an amount equal to the longitudinal spacing between the reference apertures in the components. The pins are inserted into and engage the apertures in the load beam and flexure, and in this manner concentrically align the apertures, and thus the load beam and the flexure, to one another. The components can then be fastened together, as by welding or other known processes.

There are certain deficiencies and shortcomings associated with prior art head suspensions, however. Conventional reference apertures such as those described above include manufacturing tolerances that affect the interface between the alignment tool and the head suspension component. The pins on the alignment tools also include manufacturing and positioning tolerances. These tolerances are cumulative so as to affect the alignment of individual head suspension components, and affect the forming of head suspension features, such as a load point dimple. In addition, when aligning individual head suspension components, the manufacturing tolerances in the apertures of the load beam and the flexure are "stacked" together because the head suspension components are engaged by common alignment pins, thus creating additional alignment problems. An additional shortcoming is that the alignment pins must typically be manufactured somewhat undersized so as to still be useable when the flexure and load beam apertures overlap each other to create a smaller through-hole for the pins to be inserted in due to manufacturing tolerances and misalignments in the head suspension components. Moreover, because the pins of the alignment tool are spaced apart a fixed distance, the pins may not be able to engage the reference apertures due to the manufacturing tolerances in the apertures.

One head suspension having aligning features that overcome the shortcomings of the described prior art, as well as a method and apparatus for forming such head suspension, is described in commonly assigned U.S. patent application No. 09/003,605 to Heeren et al. This head suspension includes a load beam and a flexure wherein the load beam has a first load beam aperture formed in the load region of the load beam. The flexure comprises a gimbal region and a load beam mounting region, and is mounted at a distal end of the load beam. The flexure has a first flexure aperture formed in the load beam mounting region that is adjacent and coincident with the first load beam aperture when the flexure is aligned over the load beam. An elongated alignment aperture is formed in one of the load beam and the flexure, and a proximal alignment aperture and distal alignment aperture are formed in the other of the load beam and the flexure. The elongated aperture overlaps at least a portion of each of the proximal alignment aperture and the distal alignment aperture so that the proximal perimeter edge of the elongated alignment aperture encroaches upon the proximal alignment aperture and the proximal perimeter edge of the distal alignment aperture encroaches upon the elongated alignment aperture. This configuration of apertures allows the flexure and load beam to be independently aligned relative to each other by dual moving pins of an alignment tool that engage the proximal perimeter edge of the distal alignment aperture and the proximal perimeter edge of the elongated alignment aperture.

An ongoing need exists, however, for improved head suspension designs for use in dynamic storage devices and for supporting head sliders over disk surfaces wherein features are formed in the head suspensions that assist in the efficient and accurate alignment of the head suspension components. Such need is felt in the areas of part manufacturability, cost savings, tool construction, and other tool and alignment related areas.

SUMMARY OF THE INVENTION

The present invention meets the ongoing need for improved head suspension designs by providing a head suspension for supporting a head slider over a rigid disk in a dynamic storage device. The head suspension includes compliant features formed in one or more components of the head suspension for use in accurately locating the components relative to tooling or to one another. Such compliant features may also be used for accurately locating other types of small precision components.

The head suspension has a component that includes a compliant feature adapted to be engaged and deflected by a first pin. The component may also include a datum engaging surface spaced from the compliant feature that is adapted to be engaged and positioned relative to a datum. The component is locatable relative to the datum by manipulation of the component with respect to the datum and the first pin. The manipulation causes the first pin to engage and deflect the compliant feature when the datum engaging surface of the component is engaged and positioned with respect to the datum. The compliant feature may be formed in a detachable portion of the head suspension component, which is later detached during head suspension formation. The compliant feature may be formed as a compliant aperture, and the datum engaging surface may be formed as a second aperture with a second pin forming the datum.

The head suspension also may include a second component having a pin engaging feature alignable with the compliant feature of the first component, such that the first pin engages the pin engaging feature and engages and deflects the compliant feature during manipulation. The second component may also include a datum engaging surface alignable with the datum engaging surface of the first component, such that both the datum engaging surfaces are engaged and positioned with respect to the datum during manipulation. The pin engaging feature of the second component may also be a compliant feature. The compliant feature, pin engaging feature and datum engaging surfaces are usable for locating the head suspension components, such as load beams, flexures, and base plates, relative to each other or to tooling for head suspension fabrication purposes.

A method for locating a component, including a component of a head suspension assembly, relative to a fixed datum is also provided. The method includes the steps of providing a component having a compliant feature and a datum engaging surface; providing a datum for engaging the datum engaging surface; providing a first pin for engaging the compliant feature; and manipulating the component with respect to the datum and first pin. The manipulation causes the first pin to engage and deflect the compliant feature when the datum engaging surface of the component is engaged and positioned with respect to the datum.

DETAILED DESCRIPTION OF THE INVENTION

Figure 1:
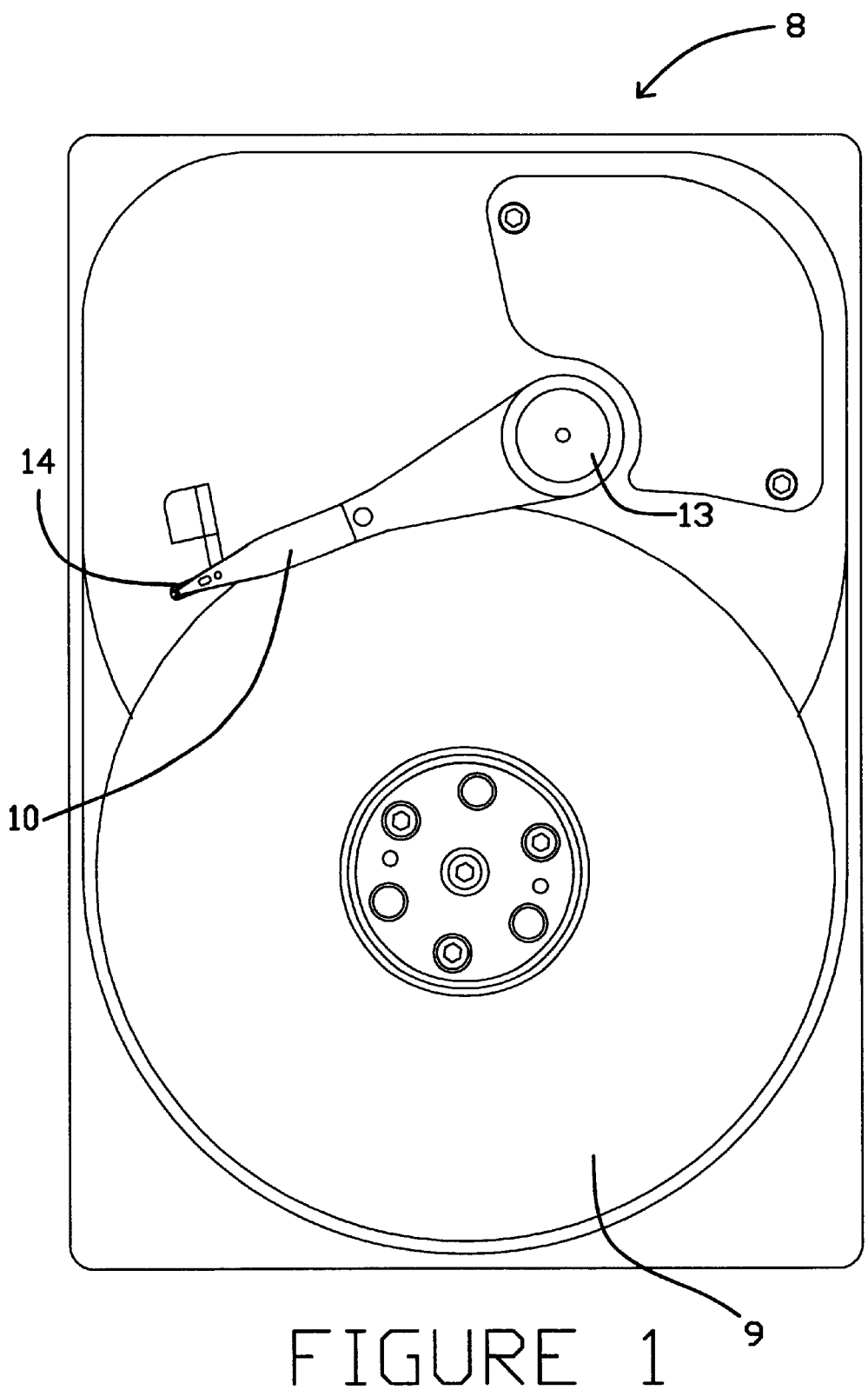
FIG. 1 is a plan view of the head suspension mounted over a rigid disk in a dynamic storage device.
Figure 2:
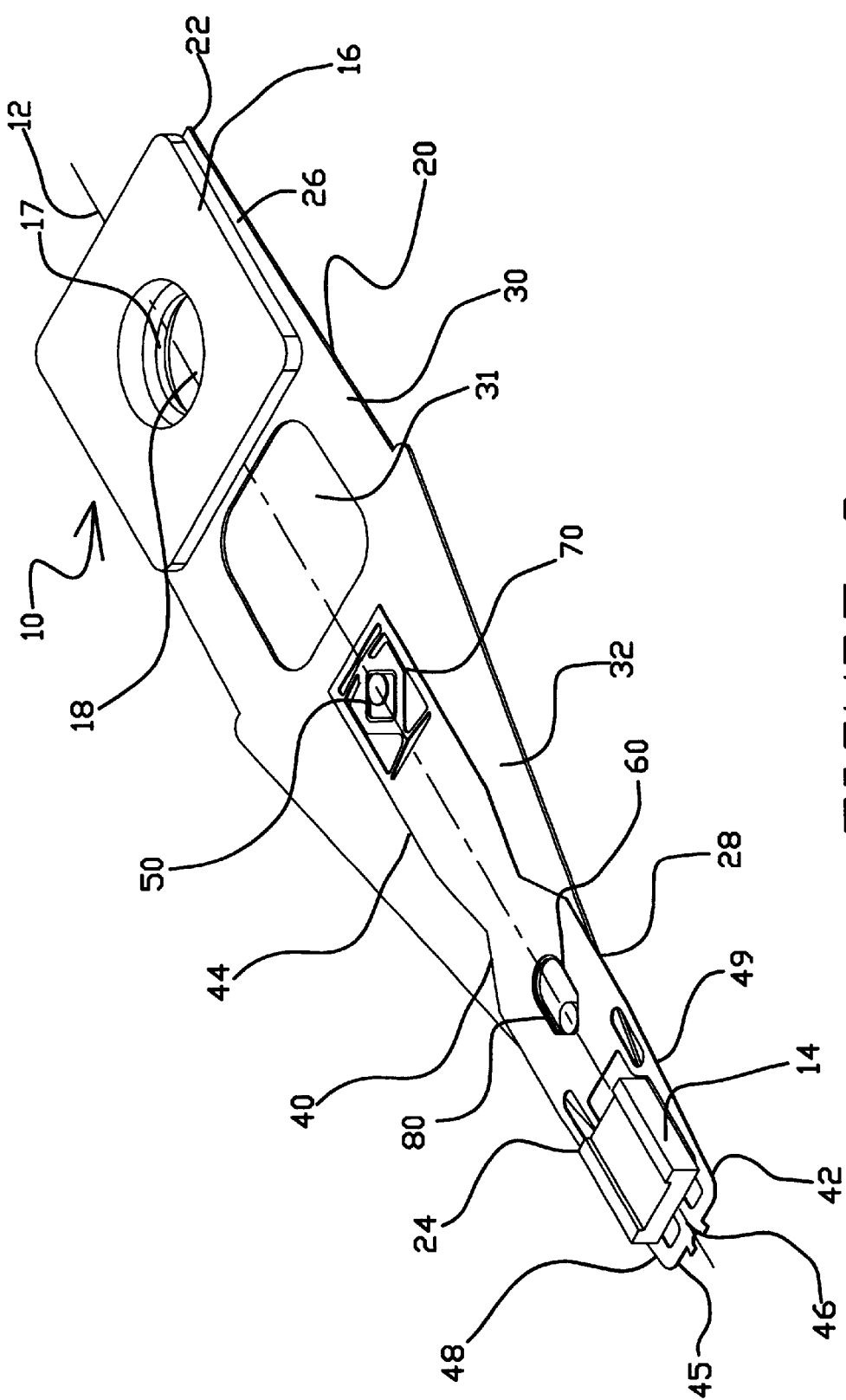
FIG. 2 is a perspective view of the head suspension of FIG. 1 including one embodiment of a compliant feature in a flexure component.

With reference to the attached Figures, it is to be understood that like components are labeled with like numerals throughout the several Figures. The present invention includes a head suspension having structures useful in minimizing misalignments in the head suspension and a method of using such structures in manufacturing such a head suspension or other small precision components. FIG. 1 illustrates a rigid disk drive 8 that includes a head suspension 10. Head suspension 10 resiliently supports a head slider 14 at a fly height above a rigid disk 9 during operation, as described above in the Background section. Head suspension 10 is connected to a rotary actuator 13, as is known, for accessing data tracks provided on the surface of rigid disk 9. Head suspension 10 could otherwise be utilized with a linear type actuator, as is also well known.

FIGS. 2–5 show head suspension 10 in greater detail. Head suspension 10 has a longitudinal axis 12, and is comprised of a base plate 16, a load beam 20, and a flexure 40. Base plate 16 is mounted to a proximal end 22 of load beam 20, and is used to attach head suspension 10 to actuator 13 in the disk drive 8. A boss 17 on base plate 16 passes through a boss aperture (not shown) in the proximal end 22 of load beam 20, and an opening 18 within the boss 17 provides the attachment mechanism for attaching the head suspension 10 to the actuator 13.

Slider 14 is mounted to flexure 40, and as the disk 9 in the disk drive 8 rotates beneath head slider 14, an air bearing is generated between slider 14 and the rotating disk 9 which creates a lift force on head slider 14. This lift force is counteracted by a spring force generated by the load beam 20 of head suspension 10, thereby positioning the slider 14 at an alignment above the disk 9 referred to as the "fly height." As described in detail below, flexure 40 provides the compliance necessary to allow head slider 14 to gimbal in response to small variations in the air bearing generated by the rotating disk 9.

Load beam 20 of head suspension 10 has an actuator mounting region 26 at proximal end 22, a load region 28 adjacent to a distal end 24, a resilient spring region 30 positioned adjacent actuator mounting region 26, and a rigid region 32 that extends between spring region 30 and load region 28. Resilient spring region 30 generates a predetermined spring force that counteracts the lift force of the air bearing acting on head slider 14. Toward this end, spring region 30 can include an aperture 31 to control the spring force generated by spring region 30. Rigid region 32 transfers the spring force to load region 28 of load beam 20. A load point dimple 34 (shown in FIG. 4) is formed in load region 28, and contacts flexure 40 to transfer the spring force generated by spring region 30 to flexure 40 and head slider 14. A load point dimple (not shown) can alternatively be formed in flexure 40 to extend toward and contact load region 28 of load beam 20.

In the head suspension shown in FIGS. 2–5, flexure 40 is formed as a separate component and is mounted to load beam 20 near the distal end 24. Flexure 40 includes a gimbal region 42 and a load beam mounting region 44. Load beam mounting region 44 overlaps and is mounted to a portion of rigid region 32 using conventional means, such as spot welds. Gimbal region 42 of flexure 40 provides the necessary compliance to allow head slider 14 to gimbal in both pitch and roll directions about load point dimple 34 in response to fluctuations in the air bearing generated by the rotating disk 9. Toward this end, gimbal region 42 includes a cantilever beam 46 having a slider mounting surface 47 to which head slider 14 is attached. Cantilever beam 46 is attached to cross piece 45, which is connected at each end to first and second arms 48 and 49, respectively, of flexure 40. Cantilever beam 46 is resiliently movable in both pitch and roll directions with respect to the remainder of flexure 40, and thereby allows head slider 14 to gimbal. Load point dimple 34 (when formed in load region 28) contacts the surface opposite the slider mounting surface 47 of cantilever beam 46 to transfer the spring force generated by spring region 30 of load beam 20 to head slider 14, and further to provide a point about which head slider 14 and cantilever beam 46 can gimbal.

Due to the high density of magnetic domains on the disk 9, and further due to the close proximity of head slider 14 to the rotating disk 9 at the slider fly height, it is important that head slider 14 be properly aligned over the disk 9. Toward this end, it is highly desirable to minimize any misalignments in head suspension 10, particularly in the alignment of the flexure 40 with respect to the load beam 20, and of the base plate 16 with respect to the load beam 20. It is also highly desirable to minimize any mislocation of the load point dimple 34 relative to the load beam 20, any mislocation of the head slider 14 relative to the flexure 40, or any misalignment between the head slider 14 and the load point dimple 34 when head slider 14 is mounted to head suspension 10. Misalignments and mislocation may occur due to tolerance stack up between the components of the head suspension 10, and between the head suspension 10 and necessary tooling used in the manufacturing process.

Figure 3:
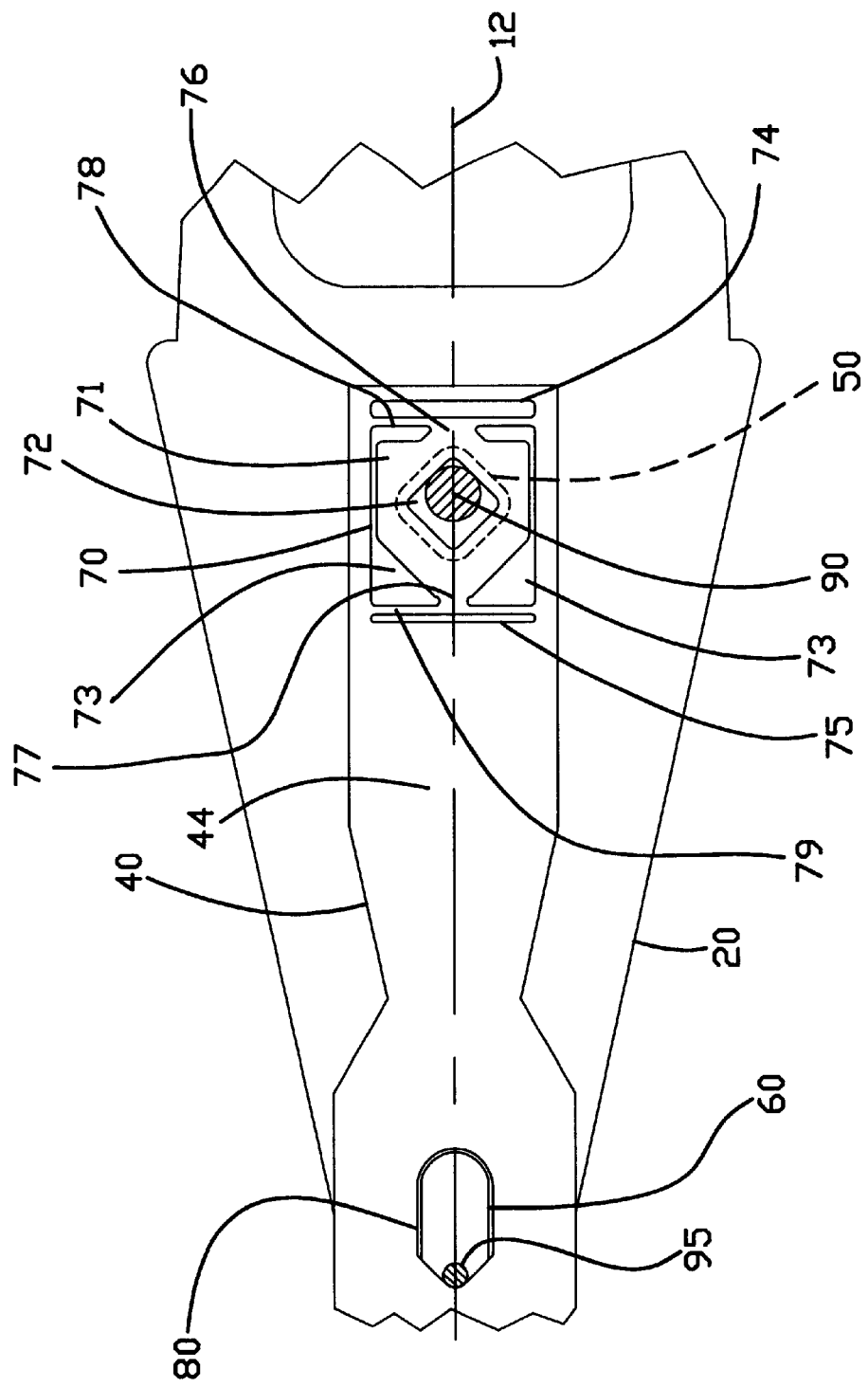
FIG. 3 is a plan detail view of the head suspension of FIG. 2 showing the compliant feature and a portion of a load beam.
Figure 4:
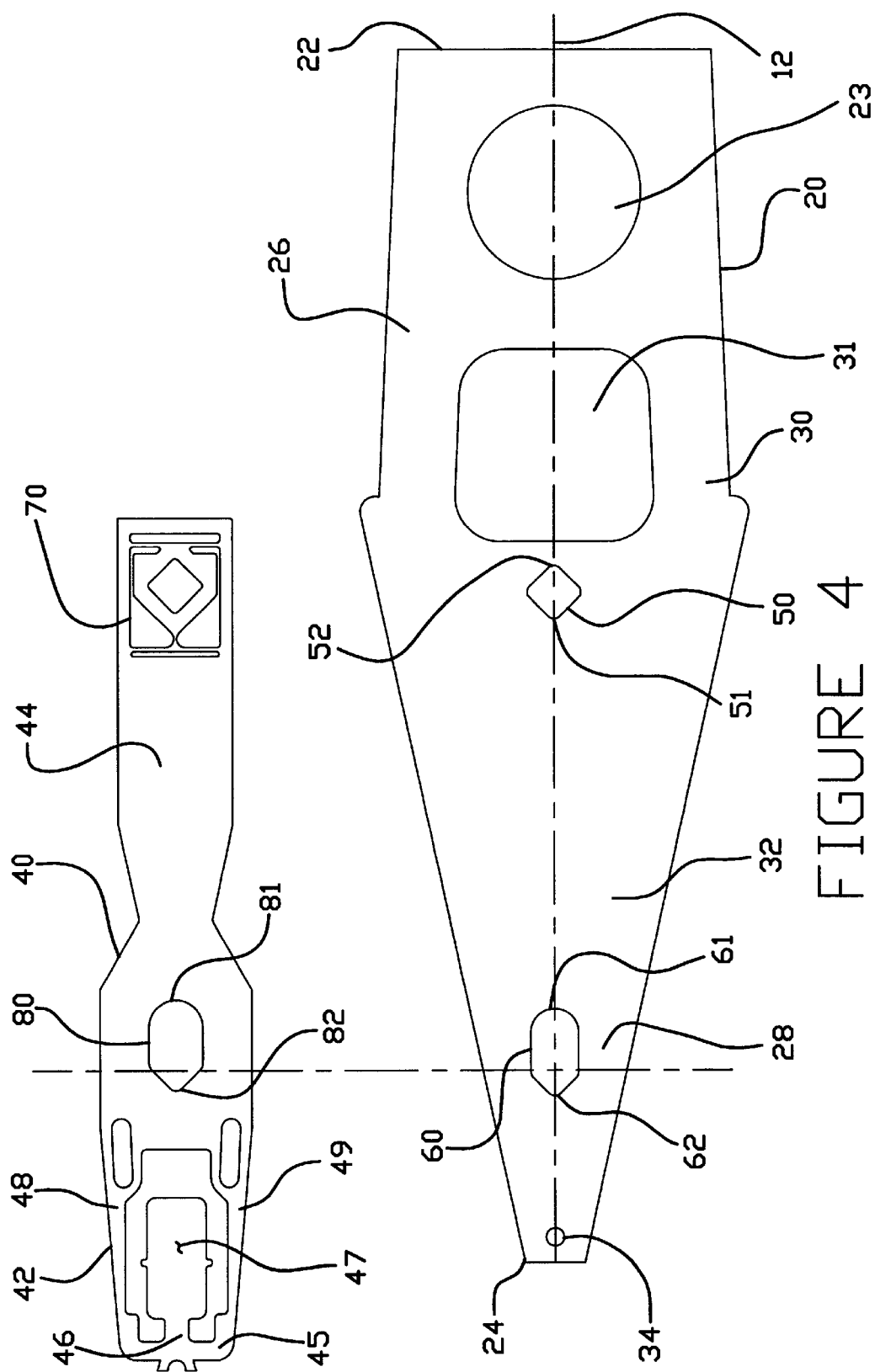
FIG. 4 is an exploded view of a portion of the head suspension of FIGS. 2 and 3 showing the overlap of the flexure over the load beam.

Referring now to FIGS. 3 and 4, in order to minimize the misalignments and mislocations in head suspension 10, head suspension 10 includes a series of structures formed in the components of head suspension 10. In FIG. 4, the load beam 20 includes a pin engaging feature referred to as a first load beam aperture 50 located in the rigid region 32 near the spring region 30, and a datum engaging surface referred to as a second load beam aperture 60 located in the load region 28 near the distal end 24. The flexure 40 includes two corresponding structures, a compliant feature referred to as a compliant first flexure aperture 70 located in the load beam mounting region 44 and a datum engaging surface or second flexure aperture 80 located near the gimbal region 42, respectively. As shown in FIG. 3, when the flexure 40 is mounted to the load beam 20, the compliant feature 70 overlaps the pin engaging feature 50 (shown in dashed lines) and the datum engaging surface of the flexure 80 overlaps the datum engaging surface of the load beam 60.

In one embodiment, the compliant first flexure aperture 70 is formed to include a central opening 72 located within a central planar region 71. The central planar region 71 is surrounded by a pair of bounding openings 73 that are separated by two bridge portions 76, 77 that tie the central planar region 71 to the remainder of the flexure 40. Two slots 74, 75 are formed transversely adjacent the bounding openings 73, creating narrow strips of flexure 78, 79 coupled to the bridge portions 76, 77, respectively. The configuration of the compliant aperture 70 is designed to be compliant along a longitudinal axis in the plane of the flexure 40, and rigid perpendicular to the longitudinal axis in the plane of the flexure 40.

The first load beam aperture 50, or pin engaging feature, has a substantially diamond shape with 'V' shaped ends 51, 52 aligned along the longitudinal axis 12. As shown in FIG. 3, the first load beam aperture 50 is larger than the central opening 72 of the compliant first flexure aperture 70. Although the first load beam aperture 50 is shown with 'V' shaped ends, it is to be understood that other suitable structures may also be used. These structures include, but are not limited to apertures having round, oval, or oblong shapes, apertures having variations on these shapes with one or more 'V' shaped ends, or other structures formed with a surface or surfaces that converge to engage a pin in a set location.

The second apertures or datum engaging surfaces 60 and 80 are shown as apertures having a substantially oblong shape with one round end 61, 81 and one 'V' shaped end 62, 82. The 'V' shaped ends 62, 82 are located on the side toward the distal end 24 of the load beam 20 pointing away from the first apertures 50 and 70, and are designed to have converging surfaces that engage a pin or other datum structure in a desired position. These two apertures 60, 80 are substantially the same size.

Figure 5:
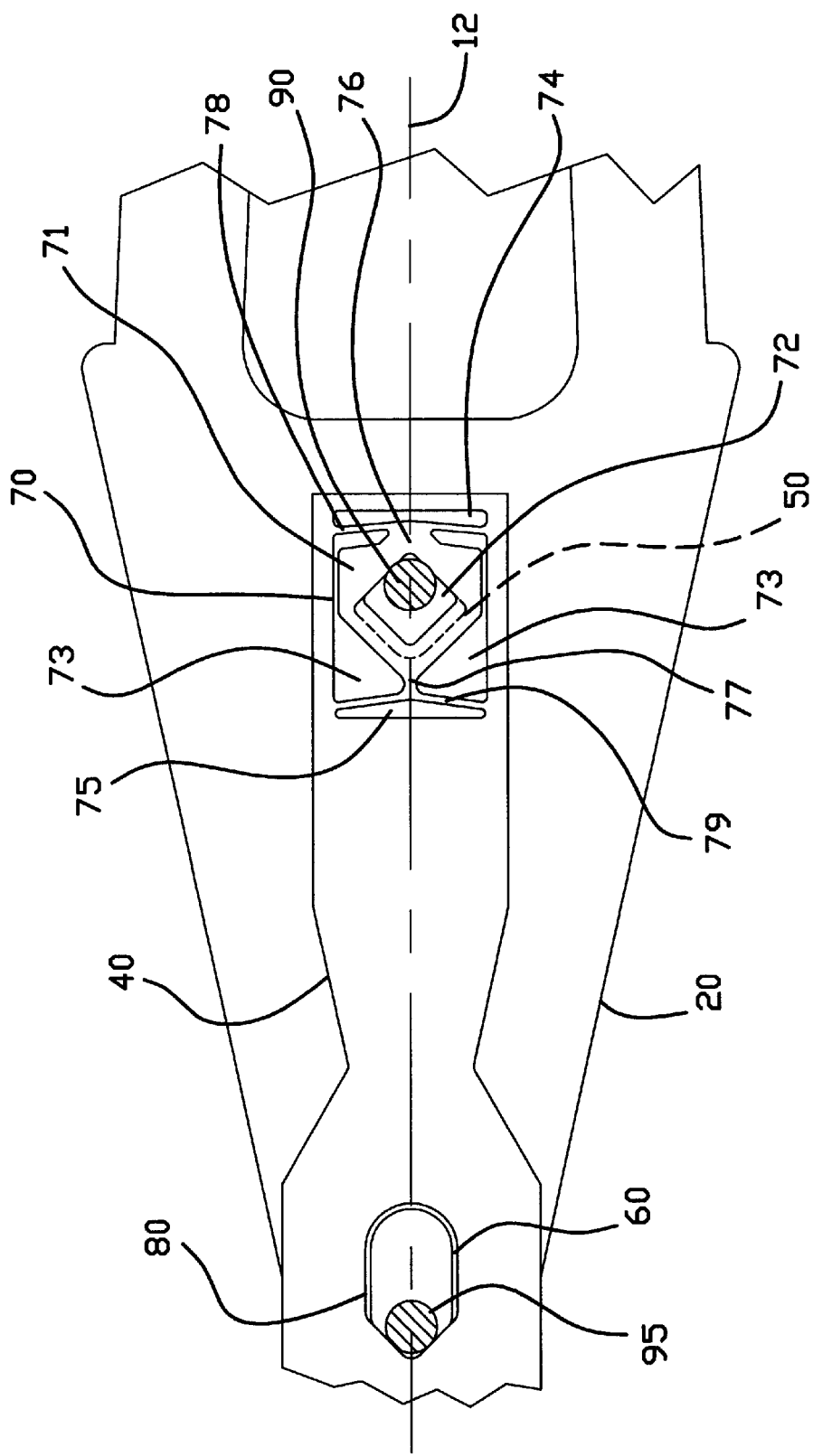
FIG. 5 is a plan detail view of the head suspension of FIG. 3 showing the compliance of the compliant feature in the flexure.

To align the flexure 40 relative to the load beam 20 during formation of the head suspension 10, the flexure 40 is placed over the load beam 20, overlapping the first apertures 70 and 50, respectively, and the second apertures 80 and 60, respectively. As shown in FIG. 3, a fixed second alignment pin 95 serving as a datum is inserted through the overlapped apertures 80 and 60, and a first alignment pin 90 is inserted through the overlapped apertures 70 and 50. The 'V' shaped ends 62, 82 of the overlapped second apertures 60, 80 engage the alignment pin 95. Referring now to FIG. 5, in one embodiment, the alignment pins 90, 95, the compliant first flexure aperture 70 and the first load beam aperture 50 are manipulated relative to one another to place the load beam 20 and flexure 30 in tension between the alignment pins 90, 95. This manipulation causes the first pin 90 to engage and deflect the compliant first flexure aperture 70 until the first pin 90 is in contact with the 'V' end 52 of the larger first load beam aperture 50, and the flexure 40 and the load beam 20 are located relative to the datum pin 95.

To achieve this result, the compliant first flexure aperture 70 moves longitudinally in the plane of the flexure 40 causing partial deflection of the compliant aperture 70. As shown in FIG. 5, as the pin 90 moves away from pin 95, the central planar region 71 moves in the same direction causing slot 74 to contract and slot 75 to expand. Both narrow strips 78, 79 also flex at bridges 76, 77, imparting a slight 'V' shape into the strips 78, 79. Once the two alignment pins 90, 95 are in position, the flexure 40 is located relative to the load beam 20 so that further manufacturing processes may be performed, such as securing the flexure 40 to the load beam 20.

The compliant first flexure aperture 70, shown in FIGS. 2–5, provides the compliance necessary to adjust for tolerance stack up between the components and the tooling. It is to be understood, however, that other suitable configurations of compliant features may also be used and are within the scope of the present invention. Such configurations may include, but are not limited to, the following examples.

Figure 6:
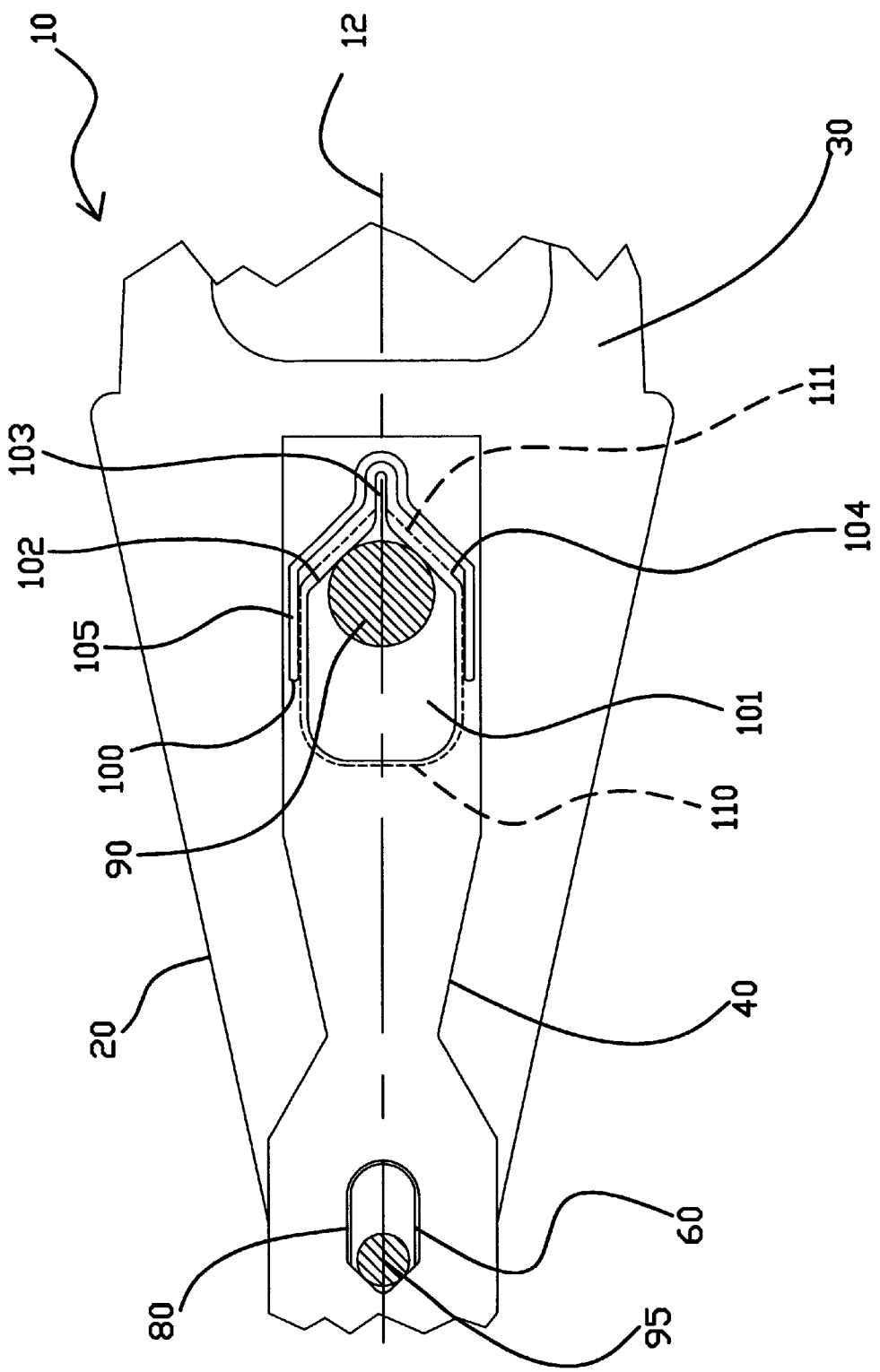
FIG. 6 is a plan detail view of a head suspension including another embodiment of a compliant feature in the flexure component.

In FIG. 6, an alternate embodiment of a compliant feature or compliant first flexure aperture 100 is shown formed in flexure 40, which has been overlaid on load beam 20. A corresponding pin engaging feature or first load beam aperture 110 (shown in dashed lines) is formed in load beam 20. Suitable datum engaging surfaces or second load beam and flexure apertures 60, 80 are formed in the load beam 20 and flexure 40, respectively, and overlapped as described in the previous embodiment. Compliant first flexure aperture 100 includes a central opening 101 having a generally oblong shape with a 'V' shaped end 102 on the spring region 30 side and a slot portion 103 extending along the longitudinal axis 12. A narrow strip 104, formed from flexure material between the central opening 101 and a corresponding contoured channel 105, follows the contour of the central opening 101 around more than half of the central opening 101. The first load beam aperture 110 underlying the compliant aperture 100 has a generally oblong shape with a 'V' shaped end 111 that is generally similar to the shape of the central opening 101, but larger in size. When the flexure 40 and load beam 20 are placed in tension between alignment pin 90 and datum pin 95, while the flexure 40 and load beam 20 are manipulated relative to pin 90 and the datum pin 95, the narrow strip 104 deflects toward the contoured channel 105 at the slot portion 103. The slot portion 103 enlarges until the alignment pin 90 contacts the 'V' end 111 of the first load beam aperture 110, locating the flexure 40 relative to the load beam 20 and the datum pin 95.

Figure 7:
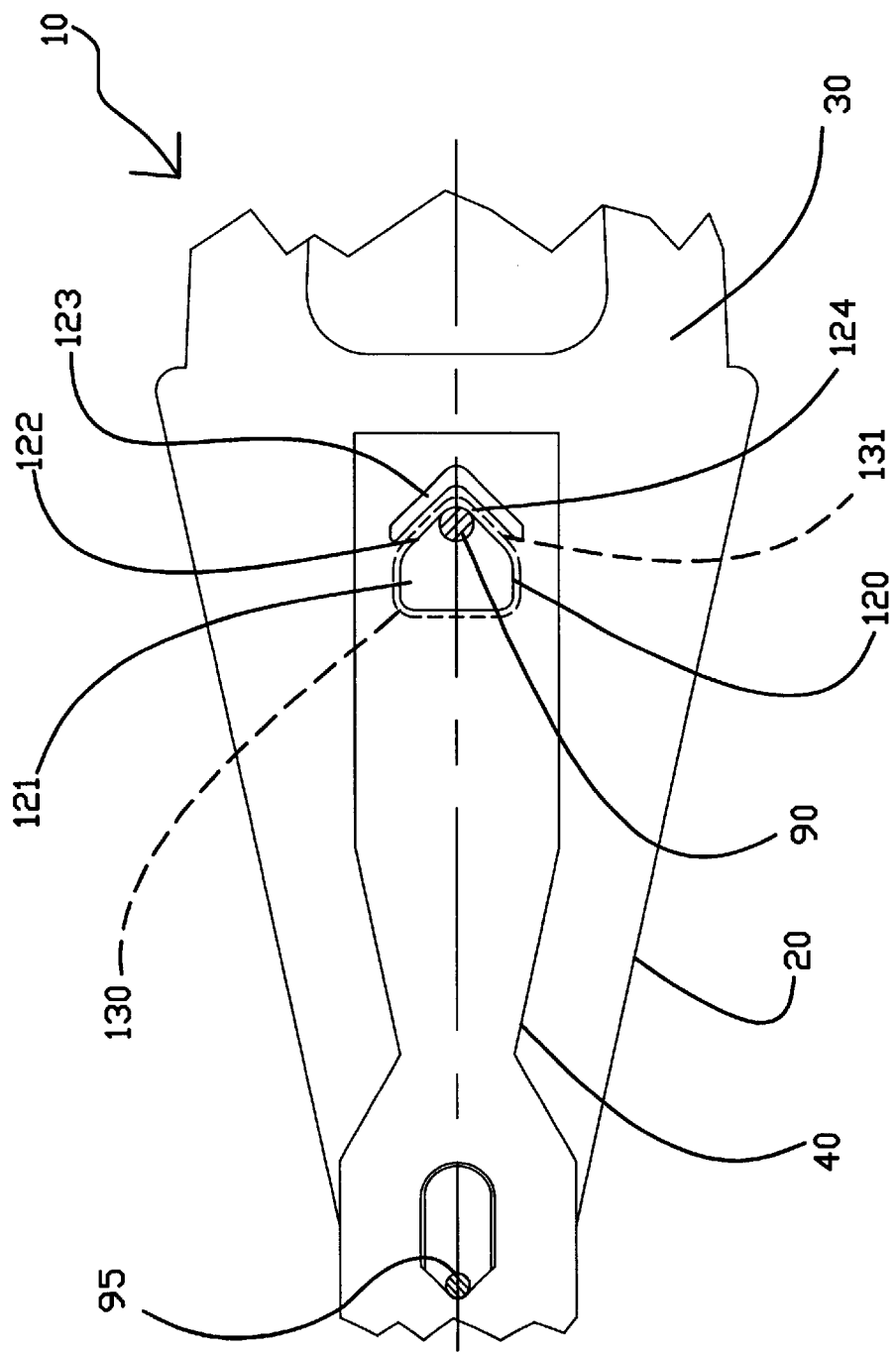
FIG. 7 is a plan detail view of a head suspension including yet another embodiment of a compliant feature in the flexure component.

In FIG. 7, another alternate embodiment of a compliant first flexure aperture 120 is shown overlapped with a first load beam aperture 130 (shown in dashed lines). Compliant aperture 120 includes a substantially rectangular opening 121 having a 'V' shaped end 122 on the side of the spring region 30, and a 'V' shaped slot 123 adjacent the opening 121 separated by a narrow strip 124 formed of flexure material. The first load beam aperture 130 is also substantially rectangular in shape with a 'V' shaped end 131, but is slightly larger in size than the opening 121. When the head suspension 10 is manipulated relative to pin 90 and the datum pin 95, the narrow strip 124 deflects toward the slot 123 until the pin 90 contacts the 'V' end 131 of the first load beam aperture 130.

Figure 8:
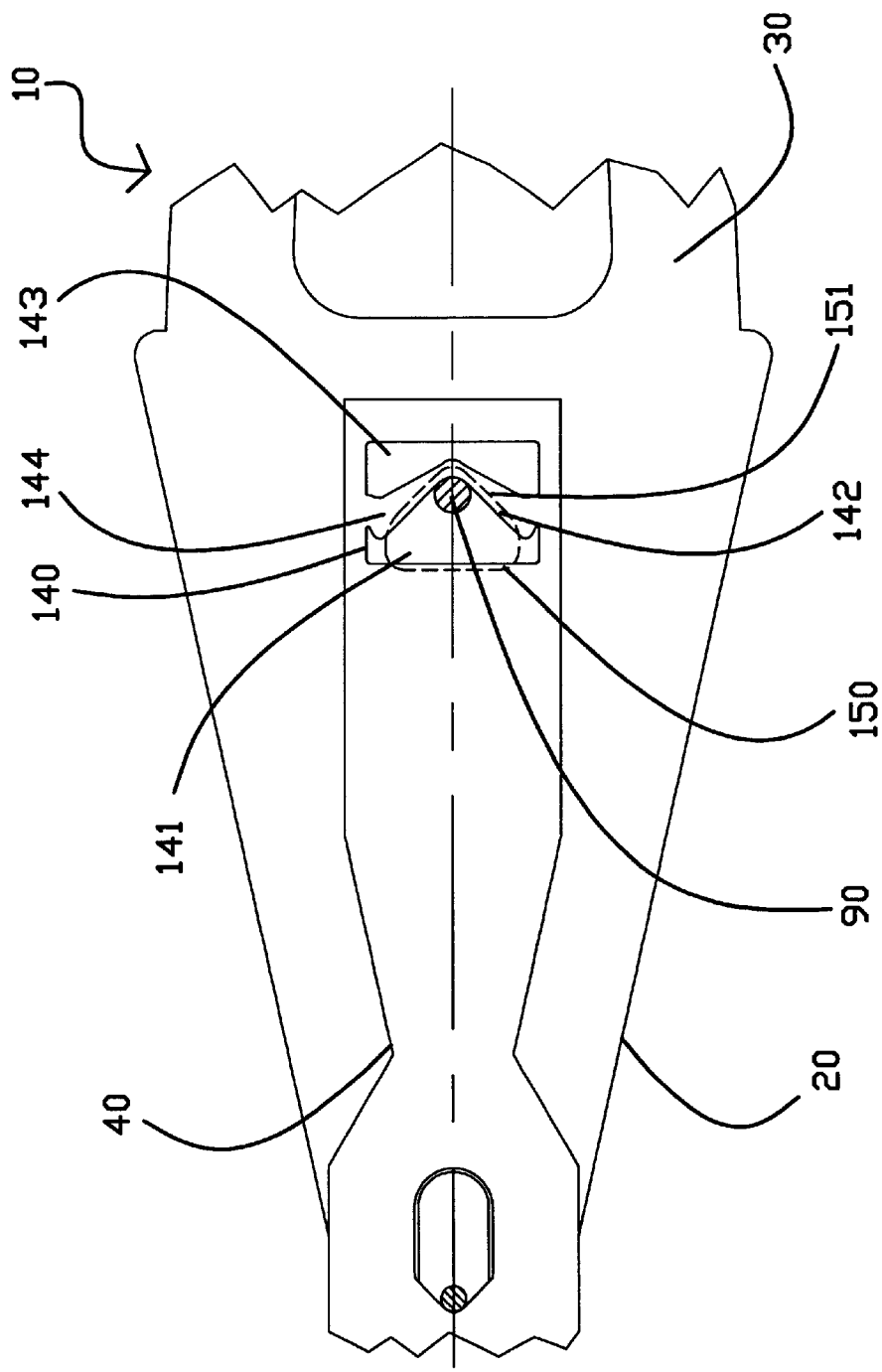
FIG. 8 is a plan detail view of a head suspension including even another embodiment of a compliant feature in the flexure component.

In FIG. 8, yet another alternate embodiment is shown of a compliant first flexure aperture 140 overlapping a first load beam aperture 150 (shown in dashed lines). The compliant aperture 140 includes a central opening 141 that is generally rectangular in shape with a modified 'W' shaped end 142 on the side of the spring region 30. Adjacent the central opening 141 is a expansion opening 143 formed as a somewhat mirror image of the central opening 141. A narrow strip 144 having a corresponding modified 'W' shape separates the central opening 141 from the expansion opening 143. The first load beam aperture 150 has a generally rectangular shape with a 'V' shaped end 151, and is sized longitudinally larger than the central opening 141. When the head suspension 10 is manipulated relative to pin 90 and the datum pin 95, the narrow strip 144 deflects toward the expansion opening 143 until the pin 90 contacts the 'V' end 151 of the first load beam aperture 150.

The compliant feature (70, 100, 120, 140) is preferably formed in the flexure 40, as described above, when coupled with a non-compliant pin engaging feature 50 because the material of the flexure 40 is generally thinner and more compliant than that of the load beam 20. However, the compliant feature may be formed in the load beam 20 instead of the flexure 40 if desired. Alternately, the compliant feature may be formed in a carrier strip attached to the flexure or a series of flexures, or the load beam or a series of load beams, as will be described in more detail below with reference to FIG. 15.

Figure 9:
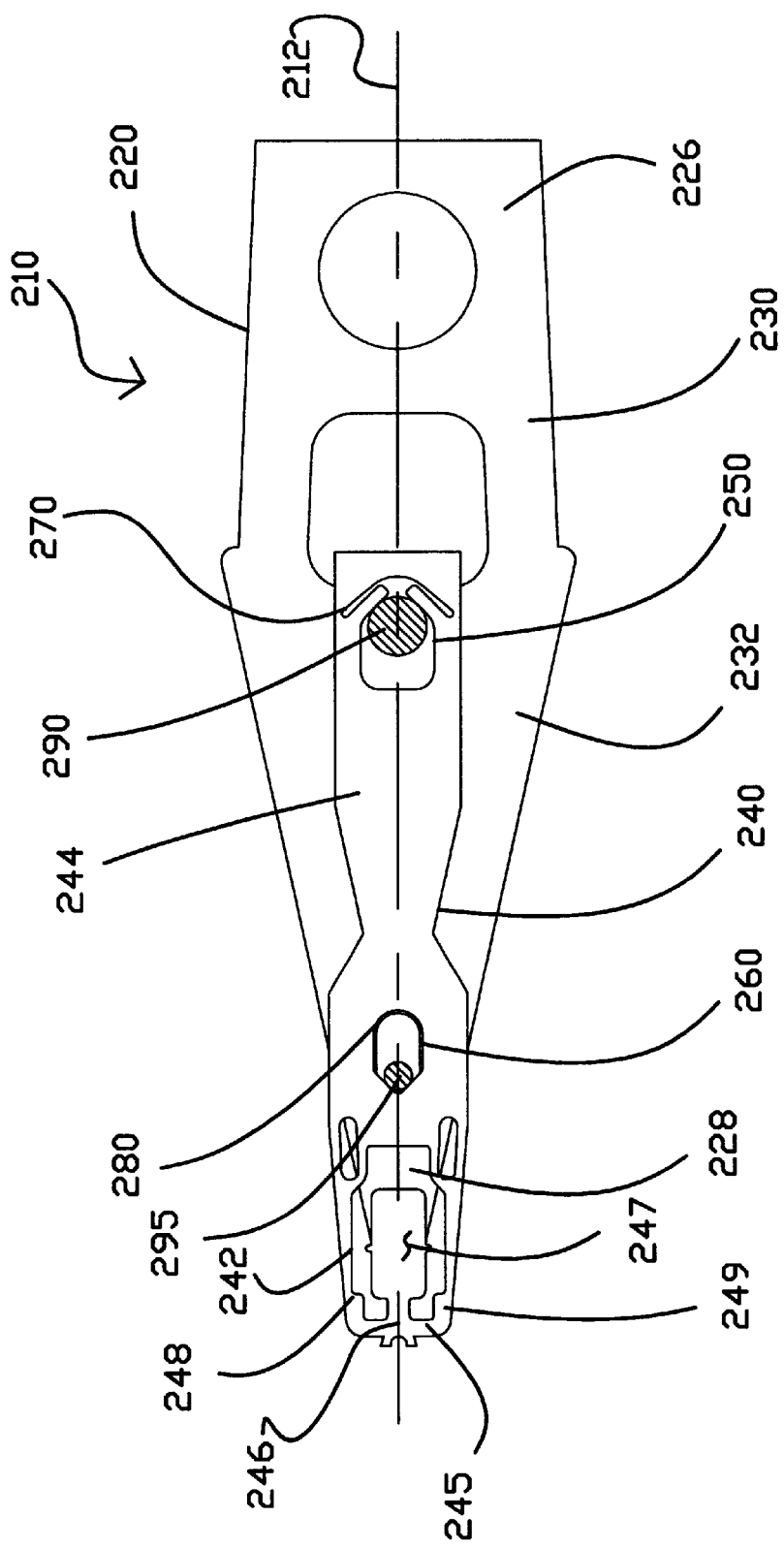
FIG. 9 is a plan view of a head suspension including one embodiment of a compliant feature in both the flexure and load beam components.
Figure 10:
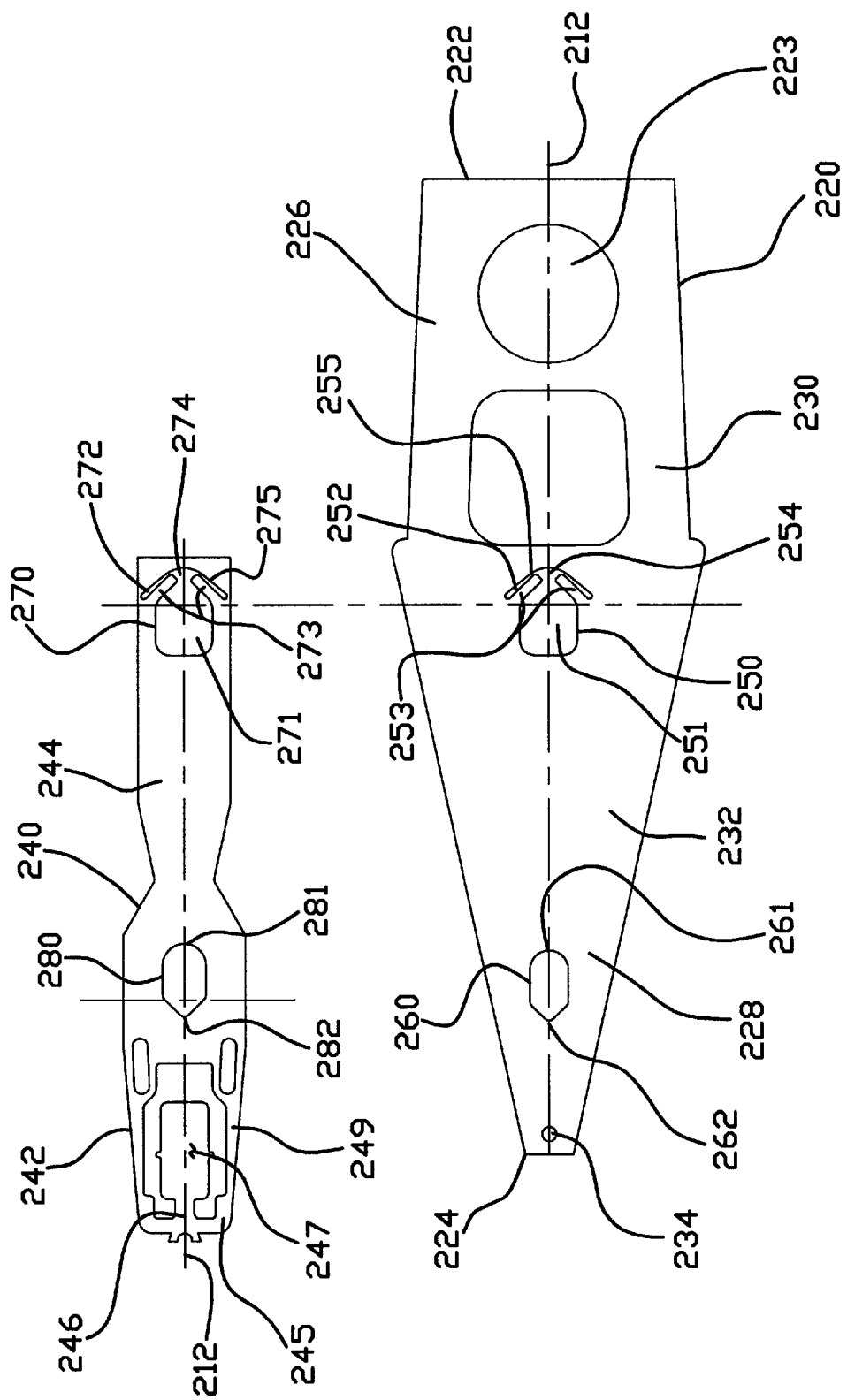
FIG. 10 is an exploded view of the head suspension of FIG. 9 showing the overlap of the flexure over the load beam.

In some situations, it may be desirable to use compliant features in both the flexure 40 and the load beam 20 in order to effectively locate the head suspension components relative to each other and/or to necessary tooling. Referring now to FIGS. 9 and 10, another embodiment of a head suspension 210 is shown having a load beam 220 with a flexure 240 overlaid on it. The load beam 220 and the flexure 240 of head suspension 210 include the same general features as their counterparts in head suspension 10 described above. As shown in FIG. 10, in particular, load beam 220 includes a compliant feature or compliant first load beam aperture 250 and a datum engaging surface or second load beam aperture 260. Flexure 240 includes another compliant feature or compliant first flexure aperture 270 and another datum engaging surface or second flexure aperture 280. When flexure 240 is overlaid over load beam 220 as shown in FIG. 9, the flexure structures 270 and 280 overlap the corresponding load beam structures 250 and 260, respectively.

The second load beam and flexure apertures 260 and 280 have a generally oblong shape with 'V' shaped ends 262 and 282, respectively, for engaging a datum such as second alignment pin 295. The compliant first load beam and flexure apertures 250 and 270 include primary openings 251, 271 and 'W' shaped flex openings 252, 272 created by flexible fingers 253, 273 formed in the load beam 220 and flexure 240, respectively. The primary openings 251, 271 are shown to be substantially rectangular in shape, but may be oval, round or other suitable shape. The flexible fingers 253, 273 angle inward toward the longitudinal axis 212 forming 'V' shaped ends for the primary openings 251, 271. Gaps 254, 274 between the flexible fingers 253, 273, coupled with channel openings 255, 275 adjacent the flexible fingers 253, 273, form the 'W' shape of the flex openings 252, 272, respectively.

Alignment pin 295 is inserted into the overlapped second apertures 260, 280, and then alignment pin 290 is inserted into the overlapped first apertures 250,270. Pin 290 and head suspension 210 are then manipulated relative to one another, causing the pin 290 to engage and deflect compliant first apertures 250, 270 and placing the flexure 240 and load beam 220 in tension between the two alignment pins 290, 295. The 'V' shaped ends 262, 282 of the second apertures 260, 280 then engage the datum pin 295, thereby locating the flexure 240 and load beam 220 relative to the datum 295 and each other.

Figure 11:
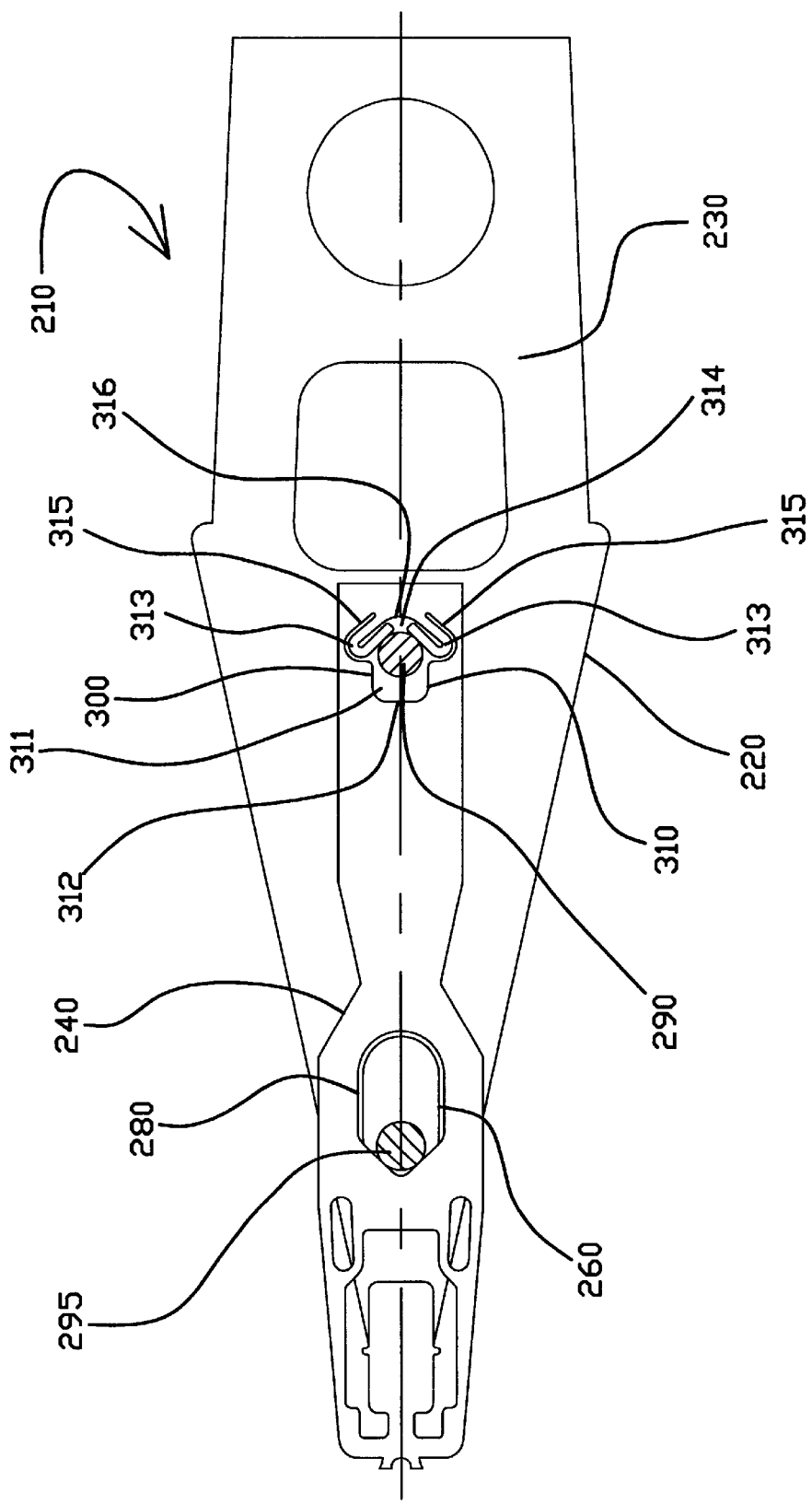
FIG. 11 is a plan view of a head suspension including another embodiment of a compliant feature in both the flexure and load beam components.

In FIG. 11, an alternate embodiment of head suspension 210 is shown having overlapped second apertures 260 and 280 and a different configuration of overlapped compliant first load beam aperture 300 and compliant first flexure aperture 310. Since both first apertures are the same, only the details of the compliant first flexure aperture 310, shown over the first load beam aperture 300 in FIG. 11, will be described.

Compliant first flexure aperture 310 includes an irregularly shaped opening 311 with a rectangular portion 312 on the distal side. Two hook shaped fingers 313 formed within the opening 311 create an open 'V' shaped region 314, two outer arm slots 315, and a modified 'W' shaped portion 316 located on the proximal side. Alignment pin 295 is initially positioned within the overlapped second apertures 260 and 280, then alignment pin 290 is positioned in the open 'V' shaped region 314 and manipulated relative to the head suspension 210. Alignment pin 290 deflects the hook shaped fingers 313 until alignment pin 295 is positioned relative to both the flexure 240 and load beam 220.

As an alternative to using alignment pins to place the components in tension between the pins, as discussed in the above described embodiments, alignment pins may be used to place the components in compression between the pins to achieve the same location result. The directions of both the compliant features (or the compliant feature and pin engaging feature) and the directions of the datum engaging surfaces in the above described embodiments may be reversed so that the converging surfaces of the datum engaging surfaces are directed toward the compliant features and the converging surfaces of the compliant features are directed toward the second apertures. Once the pins are inserted into their respective apertures, manipulation of the components and the pins causes the components to be placed in compression between the pins, and thus alignment of the components relative to each other and the datum would be achieved.

Figure 12:
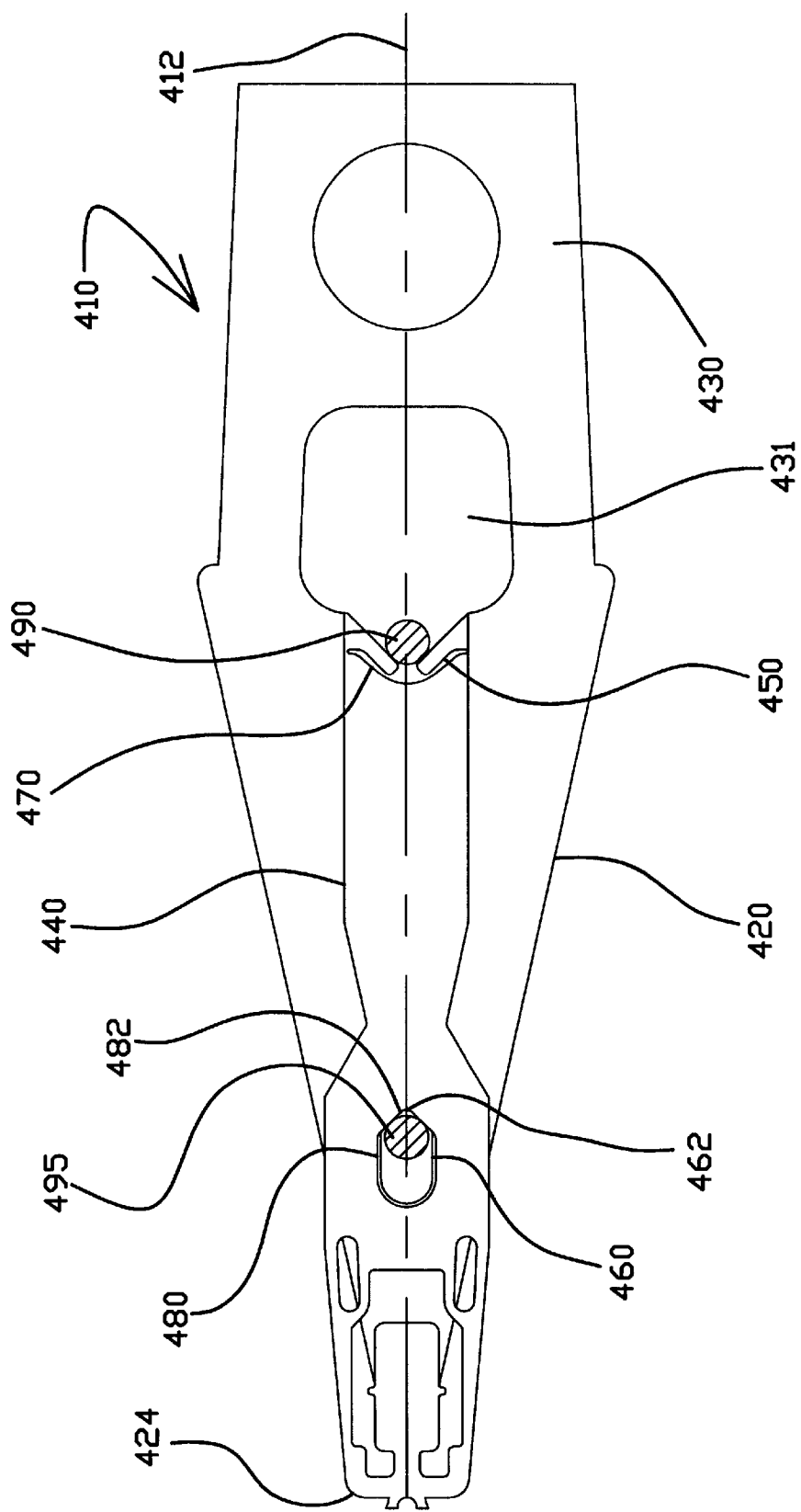
FIG. 12 is a plan view of a head suspension including yet another embodiment of a compliant feature in both the flexure and load beam components.
Figure 13:
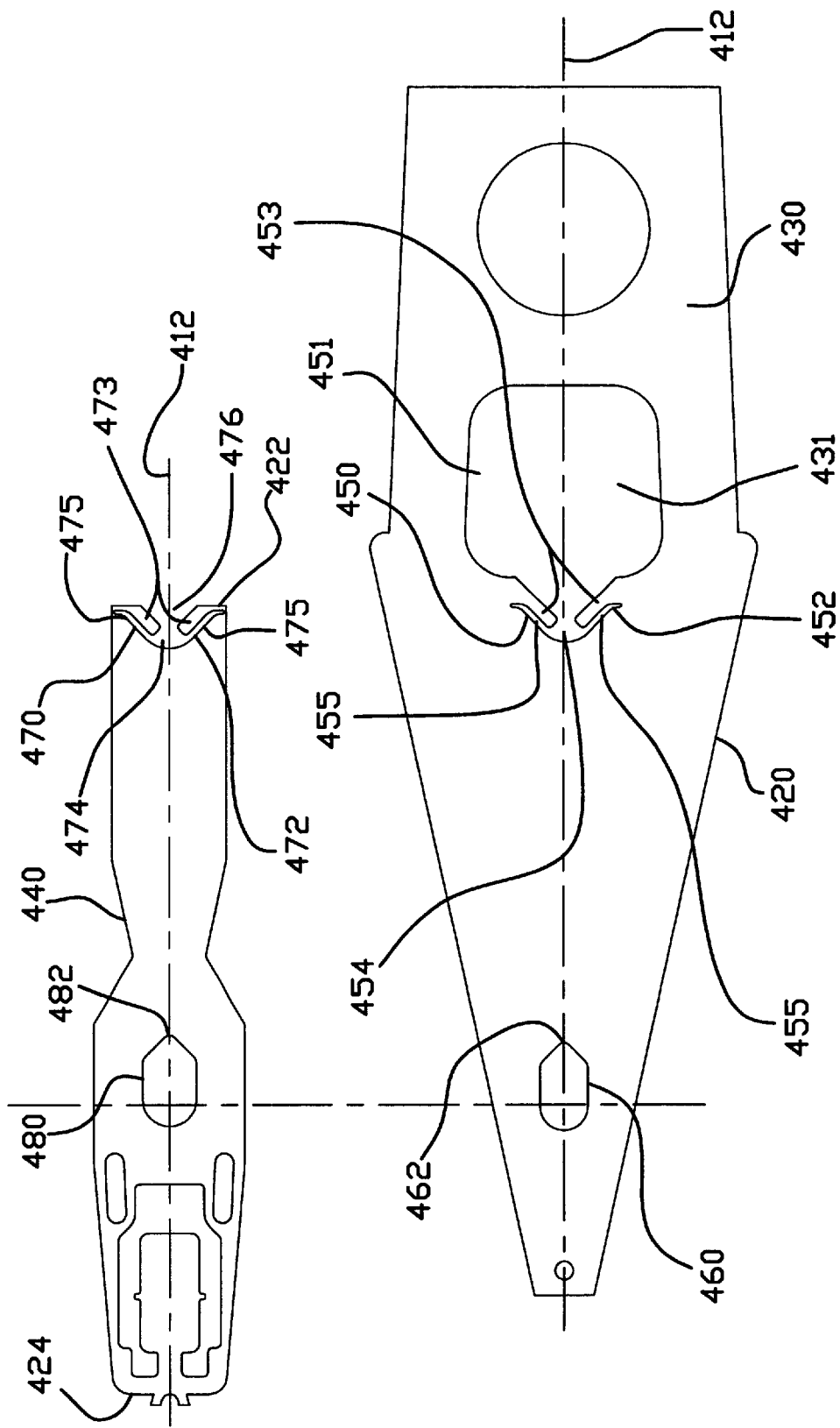
FIG. 13 is an exploded view of the head suspension of FIG. 12 showing the overlap of the flexure over the load beam.

Referring now to FIGS. 12 and 13, one embodiment for implementing this situation is shown for head suspension 410 having flexure 440 overlaid over load beam 420. Similar datum engaging surfaces or second apertures 460 and 480 overlap to be used with datum alignment pin 495.

However, 'V' shaped ends 462 and 482 are located on a side away from distal end 424 of head suspension 410, pointing toward compliant features 450 and 470, instead of away from these features 450, 470 as was shown in the prior embodiments.

Compliant feature or compliant first load beam aperture 450 is formed adjacent to and in connection with an aperture 431 provided to control the spring force generated by spring region 430. Aperture 431 forms the primary opening 451 of the compliant first load beam aperture 450, and a 'W' shaped flex opening 452, created by flexible fingers 453 formed in the load beam 420, is formed adjacent aperture 431. The flexible fingers 453 angle inward toward the longitudinal axis 412 forming a 'V' shaped end for the primary opening 451 pointing toward the second aperture 460. A gap 454 between the flexible fingers 453 coupled with channel openings 455 adjacent the flexible fingers 453 form the 'W' shape of the flex opening 452.

Compliant feature 470, on the other hand, is not an aperture in that it does not include a primary opening, but instead is actually a compliant notch-type structure positioned at the proximal end 422 of flexure 440. This compliant structure includes a 'W' shaped flex opening 472, corresponding to the 'W' shaped flex opening 452 of the load beam 420. Flexible fingers 473 formed in the flexure 440 angle inward toward the longitudinal axis 412 forming a 'V' shaped notch 476 pointing toward the second aperture 480. A gap 474 between the flexible fingers 473 coupled with channel openings 475 adjacent the flexible fingers 473 form the 'W' shape of the flex opening 472.

With this configuration, datum alignment pin 495 is inserted through the overlapped apertures 460, 480, and alignment pin 490 is inserted through compliant aperture 450 and engages compliant feature 470. Alignment pin 490 then places the components in compression relative to the datum 495, with datum pin 495 engaging the 'V' shaped ends 462, 482 of the second apertures 460, and 480. Head suspension 410 and flexure 440 are then manipulated relative to the alignment pin 490 and datum pin 495. This manipulation causes pin 490 to engage and deflect flexible finger 453 and 473 until pin 490 is positioned uniformly relative to both the compliant features 450 and 470 when the second apertures 460 and 480 are engaged and positioned with respect to the datum pin 495.

As would be apparent to one skilled in the art, other suitable compliant feature configurations may be formed in both the flexure 240, 440 and the load beam 220, 420, to be used in either tension or compression, to achieve the same results as those described above. Such compliant features would include compliant elements formed within one or more head suspension components. Additionally, such compliant features used in combination with such datum engaging surfaces may be formed in other types of small precision components to provide alignment and locating capability for those components. It is to be understood that such features are within the spirit and scope of the present invention.

Figure 14:
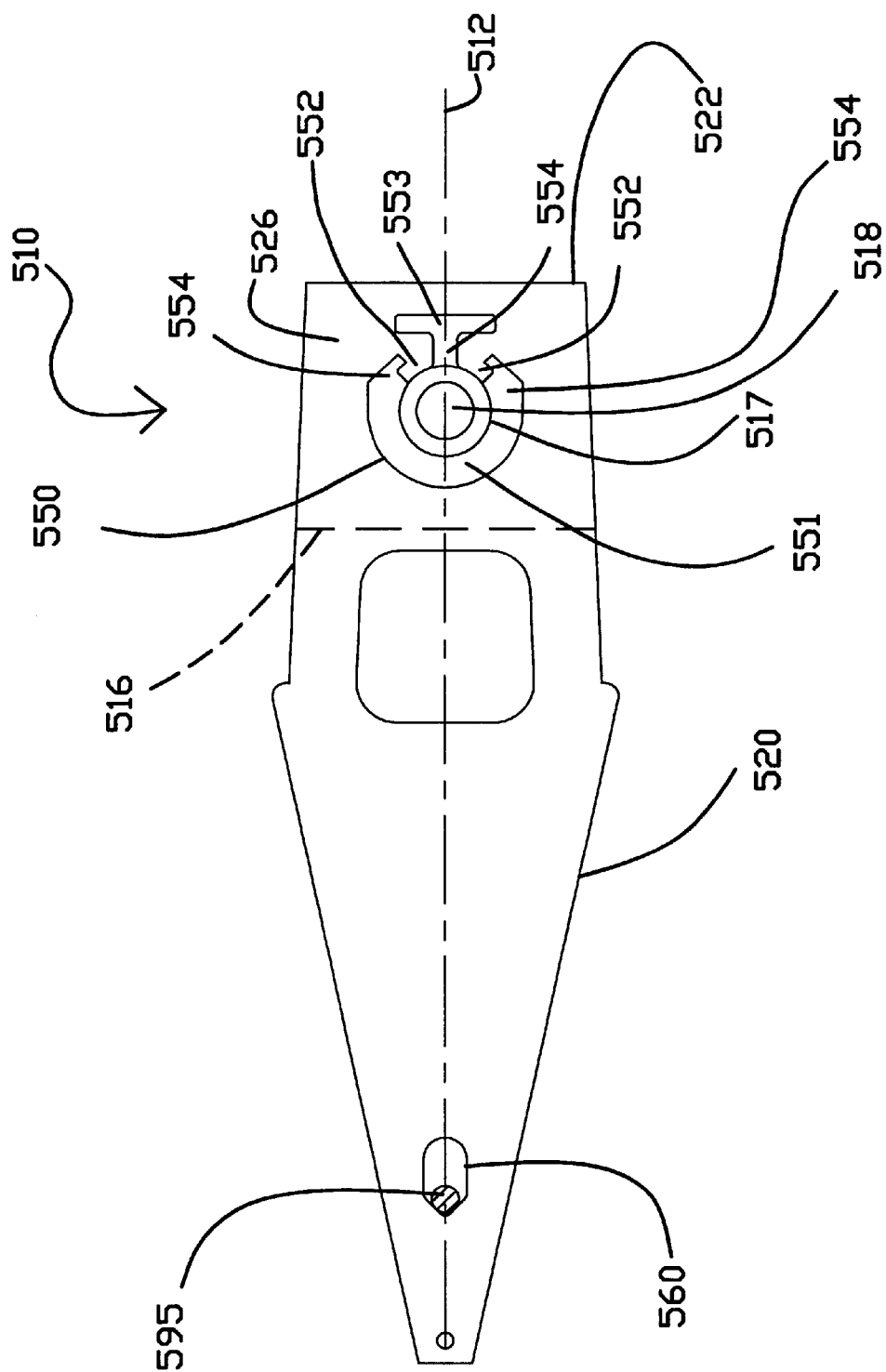
FIG. 14 is a plan view of a head suspension including one embodiment of a compliant feature in the load beam for use in locating a base plate.

In addition to limiting misalignments and mislocations by aiding in location of a flexure relative to a load beam, as described in the above embodiments, compliant features may also be used in head suspensions to locate a component relative to tooling or to locate other components relative to the load beam or to each other. In FIG. 14, an example of the latter is shown for a head suspension 510 including a load beam 520 and base plate 516 (shown in hidden lines). Base plate 516 includes a boss 517 having an opening 518 used to position and attach the head suspension 510 to the actuator (not shown).

Load beam 520 includes a datum engaging surface 560, similar to those described above, for engaging and positioning the load beam with respect to a datum pin 595. The load beam 520 also includes a compliant feature or compliant boss aperture 550 provided in the proximal end 522 of load beam 520 to locate the base plate 516 relative to the load beam 520. In one embodiment, boss 517 passes through the compliant boss aperture 550 to serve as an alignment pin, similar in function to the alignment pins described above. Compliant boss aperture 550 includes a primary opening 551 that is generally round in shape. Formed from the load beam 520 are two flexible fingers 552 configured to angle away from a longitudinal axis 512, forming a 'V' shaped end on the proximal side of the primary opening 551. A generally 'T' shaped slot 553 with a portion 554 passing between the two flexible fingers 552 is formed adjacent the primary opening 551.

A pin (not shown) is typically placed through boss opening 518 to facilitate manipulation of the baseplate 516. When the boss 517 is inserted through the compliant boss aperture 550 and datum pin 595 is inserted through the datum engaging surface 560, the load beam 520 is manipulated relative to the boss 517 and the datum pin 595. The manipulation causes the boss 517 to deflect the flexible fingers 552 until boss 517 is positioned uniformly relative to the load beam 520. Additional reference structures (not shown), such as a reference plane, may also be used to aid in squaring the base plate 516 relative to the load beam 520.

In an alternate embodiment, base plate 516 may be overlaid on load beam 520 such that boss 517 does not pass through the compliant boss aperture 550 but is positioned to overlap the aperture 550. In this situation, an alignment pin (not shown) is inserted through compliant boss aperture 550 and through the overlapping opening 518 of boss 517. The load beam 520 and base plate 516 are then manipulated relative to the alignment pin and datum pin 595 until the alignment pin engages and deflects the compliant boss aperture 550 when the datum engaging surface 560 is engaged and positioned relative to the datum pin 595.

In order to position a single component relative to tooling or other desired datum, a compliant feature or features may be formed within the component, with or without additional non-compliant features. In FIG. 10, for example, both the load beam 220 and the flexure 240 are locatable relative to a datum such as tooling on their own, in addition to being locatable relative to each other. The load beam 220 may be positioned relative to two tooling alignment pins (as shown in FIG. 9) so that further manufacturing processes may be performed on the load beam 220. These processes may include, but are not limited to formation of the dimple 234. The flexure 240 may be positioned relative to two tooling alignment pins for further processing, as well, including but not limited to forming gimbal features. The provided features, both compliant and non-compliant, are also available for use in future processes, including assembly, head slider attachment, head suspension mounting, or other suitable process.

Figure 15:
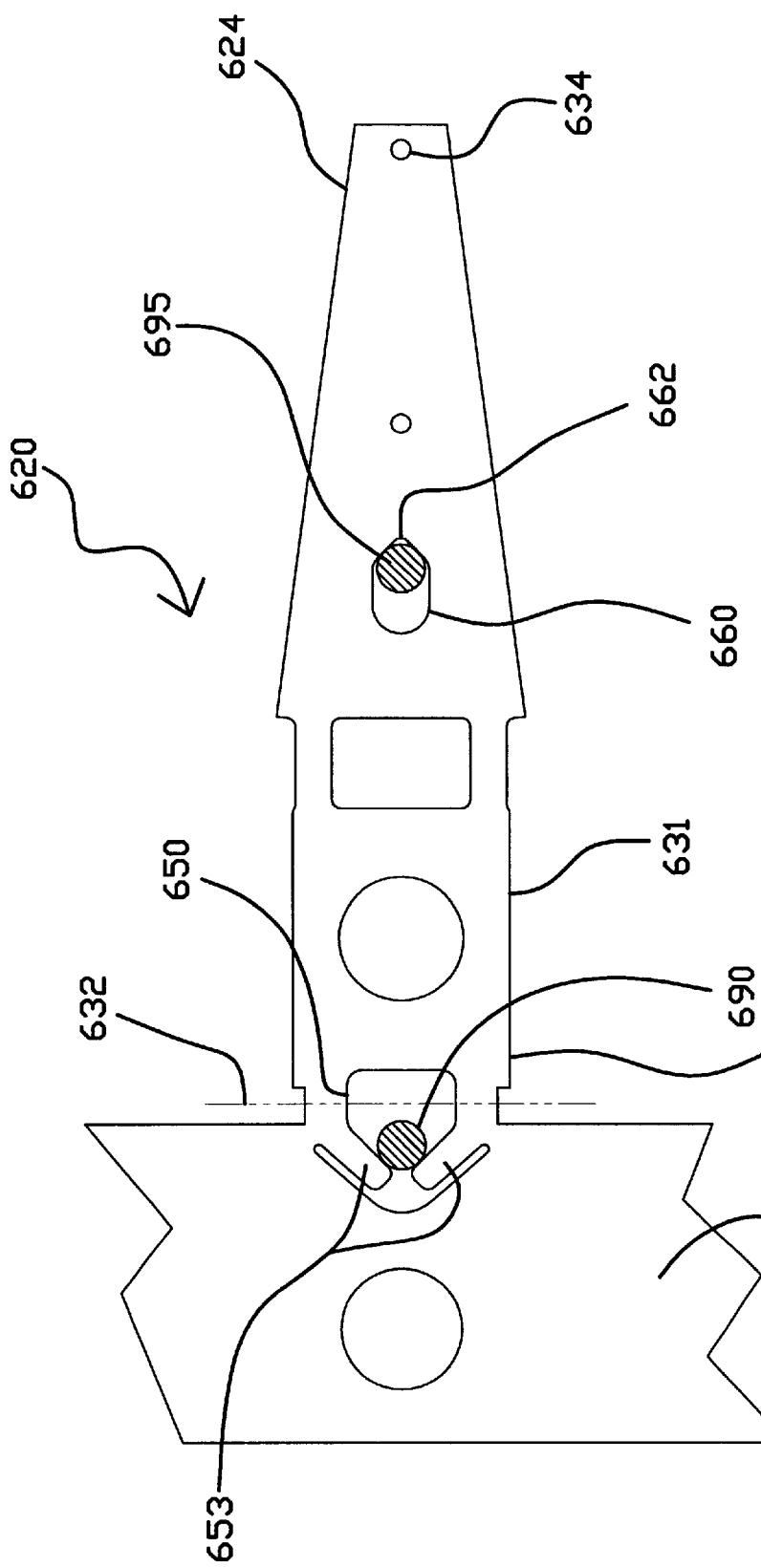
FIG. 15 is a plan view of the load beam of a head suspension located on a detachable carrier portion including a compliant feature on the carrier portion.

In FIG. 15, an alternate configuration of compliant feature placement is shown for a load beam 620. The load beam 620 includes a detachable carrier portion 630 (or carrier strip) designed to carry multiple load beams 620 through one or more manufacturing processes, and a load portion 631 designed to perform the load beam functions. A compliant feature or compliant first aperture 650 is positioned at the proximal end 622 of the load beam 620 at the juncture between the detachable carrier portion 630 and the load portion 631. A shear line 632 is shown in phantom positioned at this juncture, indicating the detachment position between the two load beam portions 630 and 631. A datum engaging surface or second aperture 660 having a 'V' shaped end 662 is provided toward the distal end 624 of the load portion 631 of the load beam 620.

The compliant first aperture 650 has a configuration similar to those described above. A pair of flexible fingers 653 are provided in a generally 'V' shape in a direction away from the second aperture 660. A datum pin 695 and then a first alignment pin 690 are inserted through the second and first apertures 650 and 660, respectively, and the component is placed in tension between the two pins 690, 695 in this configuration. Manipulation of the load beam 620 relative to the datum pin 695 and first pin 690 causes engagement and deflection of the flexible fingers 653 when the datum engaging surface is engaged and positioned relative to the datum pin 695. Necessary manufacturing processes may then be performed with a minimum of misalignment and Dislocation. Once the usefulness of the detachable carrier portion 630 is finished, the load portion 631 of the load beam 620 may be detached from the detachable carrier portion 630 at the shear line 632. The compliant first aperture 650 is then no longer available for use with the load portion 631 (and subsequent head suspension) during future handling or processing of the load beam 620. Whether or not availability of the compliant aperture is necessary or desired depends on the ultimate configuration of the head suspension, the ultimate user of the head suspension, and other manufacturing and/or business issues.

As is apparent to one of skill in the art, numerous combinations and permutations of the above described components and features may be designed depending on the needs of the head suspension manufacturer and user. Simultaneous attachment of two or more components together can be achieved using multiple features. For example, in the situation shown in FIG. 15, a flexure (not shown) could be added after the load beam 620 was positioned, wherein the flexure also included a detachable carrier portion. The flexure could include a non-compliant feature to overlap the datum engaging surface 660 and a compliant feature located in the detachable carrier portion in a manner similar to compliant feature 650 described above. The load beam apertures would be used in tension and the flexure apertures used in compression, thereby requiring only one datum engaging surface 660 within the functioning part of the head suspension, but providing effective location of both the load beam and flexure relative to tooling and each other during the manufacturing process. Many other such configurations are also possible and within the scope and spirit of the present invention.

In the embodiments described above, manipulation of the head suspension relative to alignment pins may be achieved in numerous ways. In these embodiments, it is preferable that the alignment pin used with the non compliant features, such as the datum engaging surfaces or pin engaging features, have a leading chamfer or bullet-nose to aid in insertion of the pin through a single feature or overlapped features.

Referring again to FIG. 9, in the embodiment shown wherein both the flexure 240 and the load beam 220 include at least one compliant feature 250, 270, alignment pin manipulation is preferably achieved using an alignment pin 290 that includes a predetermined taper. The two alignment pins 290 and 295 are maintained at a fixed distance relative to one another with the datum alignment pin 295 being straight and of a consistent diameter except for the leading chamfer or bullet-nose mentioned above. The taper of the manipulated alignment pin 290 is designed to provide a sufficient increase in diameter to engage and deflect the flexible fingers 253 of the compliant feature 250. The taper of the alignment pin 290 works against the spring force of the flexible fingers 253 until the components are positively located against the datum pin 295. Flexible fingers 253 may deflect both in the plane of the head suspension 210 or out of that plane.

The manipulated alignment pin 290 is preferably fixed at a calculated offset distance from the designed distance between the features in order to provide removal of the stacked up tolerances of the equipment, tool and components when the components reach their positive location. In use, the fixed datum pin 295 and taper pin 290 may be pushed through the apertures of the component or components, or the component or components may be pushed onto the alignment pins, both in a direction perpendicular to a longitudinal axis of the components in the plane of the components, to achieve the same results. The distance between the axes of the two pins 290, 295 remains constant during manipulation of the components.

Referring now to FIGS. 2–8, in the embodiments shown wherein the flexure 40 includes at least one compliant feature 70, 100, 120, 140 and the load beam 20 includes no compliant features, a longitudinal force is required to deflect the compliant feature 70, 100, 120, 140 and positively locate the components relative to the datum pin 95. With the datum pin 95 in a fixed position, the manipulated pin 90 is preferably moved relative to the datum pin 95. Various mechanisms for providing a manipulated pin that moves relative to a fixed pin are generally known in the art.

Figure 16:
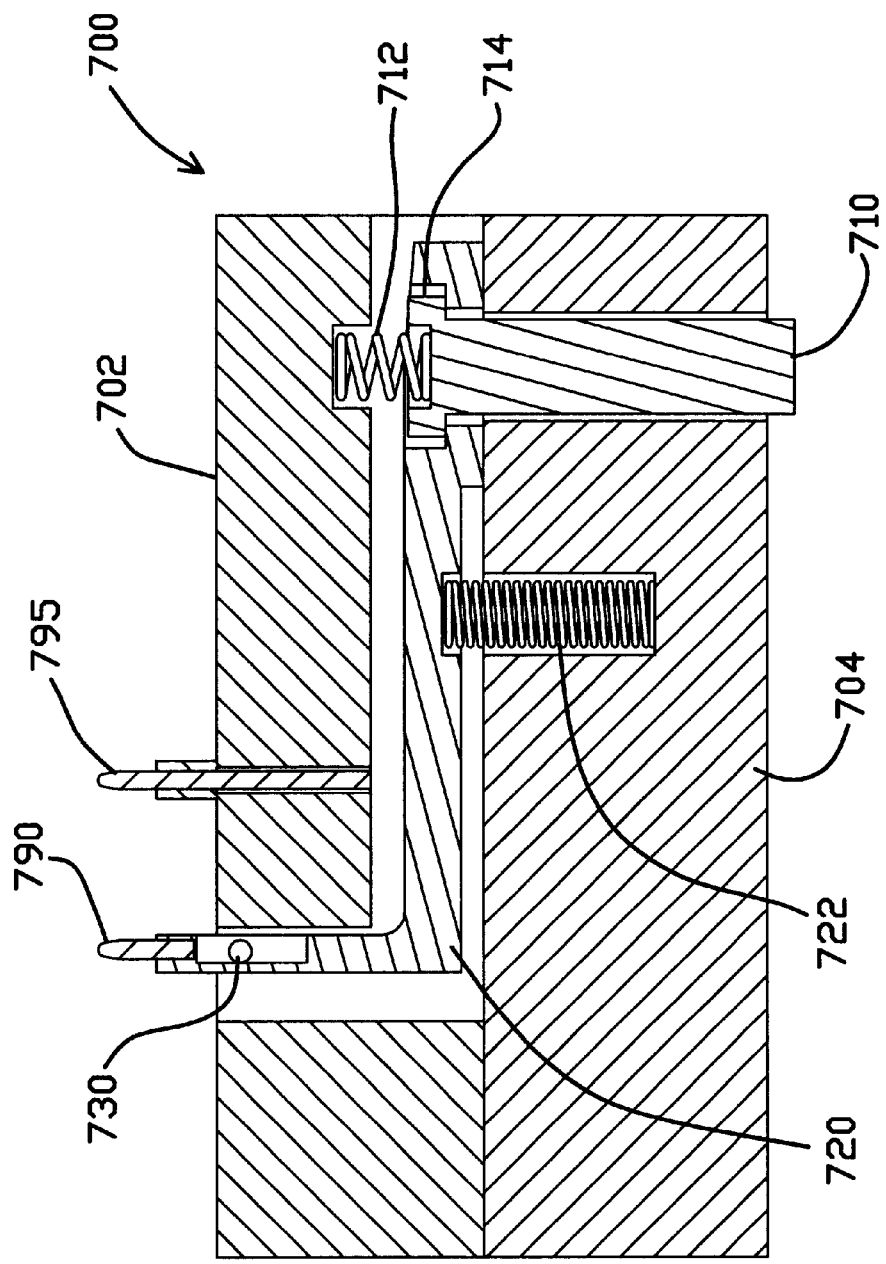
FIG. 16 is a side cross-sectional view of one embodiment of a tool for manipulating head suspension components having a compliant feature.

In FIG. 16, one embodiment of a tool 700 providing one fixed datum pin 795 and one movable manipulated pin 790 is shown. The tool 700 includes a top 702 and a bottom 704. The datum pin 795 is mounted within the top 702. A pin rocker linkage 720 is held in place between the top 702 and the bottom 704 by a spring pin 710, a return spring 712, a pivot 730 and an actuation spring 722. When opposite forces are applied to the spring pin 710 and the top 702, the spring pin 710 compresses the return spring 712 and disengages from the pin rocker linkage 720 at bore 714. Pin rocker linkage 720 is then free to move upward, toward the top 702, under the force of the actuation spring 722. Movement of the pin rocker linkage 720 then rotates the movable pin 790 about pivot 730, thereby providing the necessary manipulated pin movement to deflect the compliant feature and locate the components relative to the datum pin 795. This tool 700 is preferably used when locating and attaching two components to one another, such as a flexure to a load beam.

Figure 17:
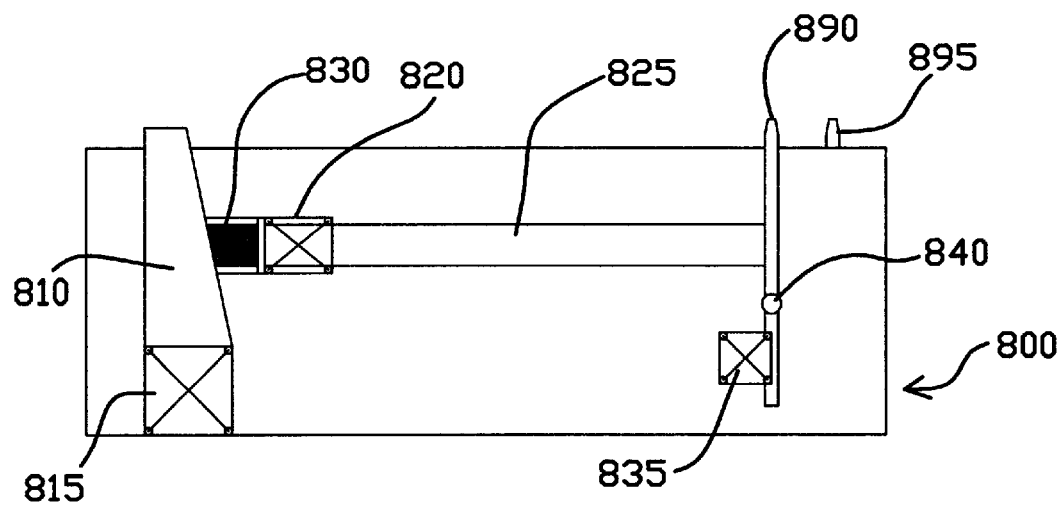
FIG. 17 is a side cross-sectional view of another embodiment of a tool for manipulating head suspension components having a compliant feature.
Figure 18:
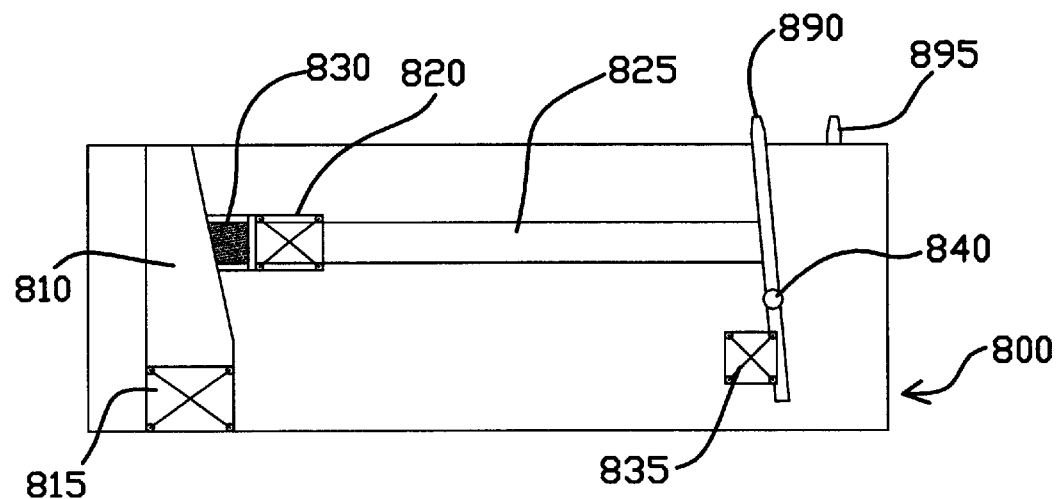
FIG. 18 is a side cross-sectional view of the tool of FIG. 17 showing the tool during actuation.

FIGS. 17 and 18 illustrate an alternate embodiment for a tool 800 providing one fixed datum pin 895 and one movable manipulated pin 890. The tool 800 includes an angle block 810 coupled to a return spring 815. An actuation punch 825 coupled to an actuation spring 820 rides along the angle block 810 at coupling 830. The actuation punch 825 contacts the movable manipulated pin 890 above a pivot axle 840. A pullback spring 835 keeps the movable pin 890 in vertical position when the actuation punch 825 is not being actuated by the angle block 810. As shown in FIG. 18, when a force is applied to the angle block 810, pushing against the return spring 815, the actuation punch 825 moves away from the movable pin 890. The pullback spring 835 then causes the moveable pin 890 to pivot about the pivot axle 840 providing tension motion between the pins 890 and 895 needed to deflect the compliant feature 70 and locate the component relative to the datum pin 895. This tool 800 is preferably used to locate a single component relative to a datum for forming operations such as dimple formation.

As would be apparent to one skilled in the art, other suitable mechanisms or structures may be used to deflect the compliant feature or features placing the components in tension or compression between the alignment pins and achieving the same results as those described above. For example, although it is preferable to use round alignment pins with 'V' shaped feature configurations, differently shaped pins and/or feature configurations may be used. It is to be understood that such configurations are within the spirit and scope of the present invention.

The compliant features of the present invention may be fabricated by standard industry methods. These methods may include etching, machining, stamping or other suitable processes.

The present invention provides a head suspension including structures in the form of compliant features that are useful in minimizing misalignments in the formation of the head suspension. The present invention uses an alignment pin and a datum to achieve a high degree of accuracy when locating a component to a tool or a component to another component. In addition, the compliant features of the present invention are capable of adjusting for tolerance stack-ups in the equipment, tool and components of the head suspension and achieve zero clearance between the alignment pins of the tool and the locating features. Another key benefit of the present invention is the reduced need for space for locating features because these features can be placed in detachable portions of the components during the manufacturing processes and not in the functioning portion of the head suspension. Additionally, the mechanisms required for use with the compliant features of the present invention are more easily manufactured and simpler to operate. In particular, some embodiments of the compliant features require no actuation in the mechanism, but provide all necessary compliance in the feature. The overall versatility of the design possibilities, design combinations, and feature permutations, coupled with the locating effectiveness, sets apart the present invention as a significant improvement in head suspension design.

Although the compliant features of the present invention have been primarily described in the context of head suspensions and head suspension components, the compliant features of the present invention are also useful for the location and alignment of other small precision components. Compliant features combined with datum engaging surfaces can be used in other situations where accurate location and alignment of one or more components relative to a datum or to each other is required. The compliant features are especially useful with small precision components having little available surface area for accommodating alignment features.

Although the present invention has been described with reference to preferred embodiments, workers skilled in the art will recognize that changes may be made in form and detail without departing from the spirit and scope of the invention. In addition, the invention is not to be taken as limited to all of the details thereof as modifications and variations thereof may be made without departing from the spirit or scope of the invention.

What is claimed is:

1. A method for positioning a head suspension component relative to a fixed datum, the method comprising the steps of:
providing a component having a compliant feature and a datum engaging surface:
providing a datum for engaging the datum engaging surface of The component;
providing a first pin for engaging the compliant feature; and
manipulating the component with respect to the datum and first pin to cause the first pin to engage and deflect the compliant feature when the datum engaging surface of the component is engaged and positioned with respect to the datum.

2. The method of claim 1, wherein the datum engaging surface comprises an aperture and the datum comprises a second pin, and wherein the step of manipulating includes inserting the second pin through the aperture.

3. The method of claim 1, wherein the step of manipulating includes moving the first pin in a direction of a longitudinal axis of the component to deflect the compliant feature.

4. The method of claim 1, wherein the step of manipulating includes moving the first pin in a direction perpendicular to a longitudinal axis of the component to deflect the compliant feature.

5. The method of claim 4, wherein the first pin is tapered on an end that engages the compliant feature of the component.

6. The method of claim 1, wherein the step of manipulating includes moving the component relative to the first pin in a direction perpendicular to a longitudinal axis of the component to deflect the compliant feature.

7. The method of claim 6, wherein the first pin is tapered on an end that engages the compliant feature of the component.

8. The method of claim 1, further comprising the step of forming a portion of the component.

9. The method of claim 8, wherein the step of forming includes forming a dimple in a desired location on the component.

10. The method of claim 1, wherein the component includes a detachable portion and the compliant feature is located in the detachable portion, and the method further comprises the step of detaching the detachable portion.

11. The method of claim 1, wherein the component comprises a first component having a compliant feature and a datum engaging surface and a second component having a pin engaging feature, and the method further comprises the step of aligning the first component relative to the second component by positioning the pin engaging feature of the second component relative to the compliant feature of the first component.

12. The method of claim 11, wherein the first pin engages the compliant feature and the pin engaging feature of the first and second components, respectively, and the step of manipulating includes manipulating the first and second components with respect to the datum and first pin to cause the first pin to engage the pin engaging feature and to engage and deflect the compliant feature when the datum engaging surface of the first component is engaged and positioned with respect to the datum.

13. The method of claim 12, further comprising the step of securing the first component to the second component.

14. The method of claim 13, wherein the first component is a load beam and the second component is a baseplate.

15. The method of claim 14, wherein the baseplate includes a boss, and the boss engages the compliant feature of the load beam.

16. The method of claim 12, wherein the second component further includes a datum engaging surface.

17. The method of claim 16, wherein the step of aligning further includes positioning the datum engaging surface of the first component relative to the datum engaging surface of the second component.

18. The method of claim 17, wherein the step of manipulating includes manipulating the first and second components with respect to the datum and first pin to cause the first pin to engage the pin engaging feature and to engage and deflect the compliant feature when both the datum engaging surfaces of the first and second components are engaged and positioned with respect to the datum.

19. The method of claim 18, wherein the datum engaging surface of the first component comprises an aperture, the datum engaging surface of the second component comprises an aperture and the datum comprises a second pin, and wherein the step of aligning includes overlapping the apertures of the first and second components and the step of manipulating includes inserting the second pin through the overlapped apertures.

20. The method of claim 18, wherein the pin engaging feature of the second component is a compliant feature.

21. The method of claim 18, further comprising the step of securing the second component to the first component.

22. The method of claim 21, wherein the first component comprises a load beam and the second component comprises a flexure.

23. The method of claim 22, wherein the step of manipulating includes moving the first pin in a direction of a longitudinal axis of the load beam and flexure.

24. The method of claim 21, wherein the first component. comprises a flexure and the second component comprises a load beam.

25. The method of claim 24, wherein the step of manipulating includes moving the first pin in a direction of a longitudinal axis of the load beam and flexure.

26. The method of claim 1, wherein the step of manipulating places the component in compression between the compliant feature and the datum engaging surface.

27. The method of claim 1, wherein the step of manipulating places the component in tension between the compliant feature and the datum engaging surface.

* * * * *